US008495663B2

(12) United States Patent
Tien et al.

(10) Patent No.: US 8,495,663 B2
(45) Date of Patent: Jul. 23, 2013

(54) REAL TIME COLLABORATION USING EMBEDDED DATA VISUALIZATIONS

(75) Inventors: Ian Tien, Seattle, WA (US); Corey J. Hulen, Sammamish, WA (US); Chen-I Lim, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1085 days.

(21) Appl. No.: 11/670,516

(22) Filed: Feb. 2, 2007

(65) Prior Publication Data

US 2008/0189724 A1    Aug. 7, 2008

(51) Int. Cl.
*G06F 3/00* (2006.01)
*G06F 3/048* (2006.01)

(52) U.S. Cl.
USPC ............ 719/329; 719/313; 715/751; 715/810

(58) Field of Classification Search
None
See application file for complete search history.

(56) References Cited

U.S. PATENT DOCUMENTS

| | | | |
|---|---|---|---|
| 5,018,077 A | 5/1991 | Healey | 715/509 |
| 5,233,552 A | 8/1993 | Brittan | 708/445 |
| 5,253,362 A | 10/1993 | Nolan | 707/1 |
| 5,404,295 A | 4/1995 | Katz et al. | 715/231 |
| 5,473,747 A | 12/1995 | Bird | 715/848 |
| 5,615,347 A | 3/1997 | Davis et al. | 715/833 |
| 5,675,553 A | 10/1997 | O'Brien, Jr. et al. | 367/135 |
| 5,675,782 A | 10/1997 | Montague et al. | 726/4 |
| 5,680,636 A | 10/1997 | Levine | 715/512 |
| 5,758,351 A | 5/1998 | Gibson et al. | 707/104 |
| 5,764,890 A | 6/1998 | Glasser et al. | 726/11 |
| 5,779,566 A | 7/1998 | Wilens | 473/407 |
| 5,797,136 A | 8/1998 | Boyer et al. | 707/2 |
| 5,819,225 A | 10/1998 | Eastwood et al. | 704/275 |
| 5,832,504 A | 11/1998 | Tripathi et al. | 715/235 |
| 5,838,313 A | 11/1998 | Hou et al. | 715/201 |
| 5,845,270 A | 12/1998 | Schatz | 706/11 |
| 5,877,758 A | 3/1999 | Seybold | 715/866 |
| 5,911,143 A | 6/1999 | Deinhart et al. | 1/1 |
| 5,926,794 A | 7/1999 | Fethe | 705/11 |
| 5,941,947 A | 8/1999 | Brown et al. | 709/225 |
| 5,943,666 A | 8/1999 | Kleewein et al. | 1/1 |
| 5,956,691 A | 9/1999 | Powers | 705/4 |
| 6,012,044 A | 1/2000 | Maggioncalda et al. | 705/36 R |
| 6,023,714 A | 2/2000 | Hill et al. | 715/235 |

(Continued)

FOREIGN PATENT DOCUMENTS

| | | |
|---|---|---|
| EP | 1128299 A1 | 8/2001 |
| EP | 1050829 A2 | 3/2006 |

(Continued)

OTHER PUBLICATIONS

"Response Time in N-user Replicated, Centralized, and Proximity-Based Hybrid Collaboration Architectures", Sasa Junuzovic, 2006, pp. 1-10.*

(Continued)

*Primary Examiner* — Tuan Dao
(74) *Attorney, Agent, or Firm* — Merchant & Gould

(57) ABSTRACT

Scorecard data is received, processed, and visualizations provided by a performance metric application. Real time collaboration between users is facilitated through context based selections from the visualizations through one or more communication applications. Performance metric application may be embedded in the communication application or vice versa through local implementation or in a service based architecture.

20 Claims, 11 Drawing Sheets

METHODS

U.S. PATENT DOCUMENTS

| Patent No. | | Date | Inventor | Class |
|---|---|---|---|---|
| 6,061,692 | A | 5/2000 | Thomas et al. | 707/613 |
| 6,097,802 | A | 8/2000 | Fleischer, III et al. | |
| 6,115,705 | A | 9/2000 | Larson | 1/1 |
| 6,119,137 | A | 9/2000 | Smith et al. | 715/234 |
| 6,141,655 | A | 10/2000 | Johnson | 707/2 |
| 6,163,779 | A | 12/2000 | Mantha | 707/100 |
| 6,182,022 | B1 | 1/2001 | Mayle et al. | 702/182 |
| 6,216,066 | B1 | 4/2001 | Goebel et al. | 701/29 |
| 6,226,635 | B1 | 5/2001 | Katariya | 1/1 |
| 6,230,310 | B1 | 5/2001 | Arrouye et al. | 717/136 |
| 6,233,573 | B1 | 5/2001 | Bair | 707/3 |
| 6,249,784 | B1 | 6/2001 | Macke | 707/3 |
| 6,308,206 | B1 | 10/2001 | Singh | 709/223 |
| 6,321,206 | B1 | 11/2001 | Honarvar | 705/7 |
| 6,322,366 | B1 | 11/2001 | Bergan et al. | |
| 6,332,163 | B1* | 12/2001 | Bowman-Amuah | 719/329 |
| 6,341,277 | B1 | 1/2002 | Coden et al. | 1/1 |
| 6,345,279 | B1 | 2/2002 | Li et al. | 715/202 |
| 6,389,434 | B1 | 5/2002 | Rivette | 715/512 |
| 6,393,406 | B1 | 5/2002 | Eder | 705/7 |
| 6,421,670 | B1 | 7/2002 | Fourman | 707/10 |
| 6,463,431 | B1 | 10/2002 | Schmitt | 1/1 |
| 6,466,935 | B1 | 10/2002 | Stuart | 1/1 |
| 6,493,733 | B1 | 12/2002 | Pollack | 715/513 |
| 6,516,324 | B1 | 2/2003 | Jones | 707/104.1 |
| 6,519,603 | B1 | 2/2003 | Bays | 707/102 |
| 6,522,342 | B1 | 2/2003 | Gagnon et al. | 715/716 |
| 6,529,215 | B2 | 3/2003 | Golovchinsky et al. | 715/764 |
| 6,563,514 | B1 | 5/2003 | Samar | 715/711 |
| 6,578,004 | B1 | 6/2003 | Cimral | 705/7 |
| 6,601,233 | B1 | 7/2003 | Underwood | 717/102 |
| 6,604,084 | B1 | 8/2003 | Powers et al. | 705/11 |
| 6,606,627 | B1 | 8/2003 | Guthrie et al. | 1/1 |
| 6,628,312 | B1 | 9/2003 | Rao | 715/853 |
| 6,633,889 | B2 | 10/2003 | Dessloch et al. | 1/1 |
| 6,658,432 | B1 | 12/2003 | Alavi et al. | 707/104.1 |
| 6,665,577 | B2 | 12/2003 | Onyshkevych et al. | 700/130 |
| 6,677,963 | B1 | 1/2004 | Mani et al. | 715/764 |
| 6,687,720 | B1 | 2/2004 | Colver et al. | |
| 6,687,735 | B1 | 2/2004 | Logston et al. | 709/203 |
| 6,687,878 | B1 | 2/2004 | Eintracht | 712/512 |
| 6,728,724 | B1 | 4/2004 | Megiddo et al. | 1/1 |
| 6,763,134 | B2 | 7/2004 | Cooper et al. | 382/162 |
| 6,772,137 | B1 | 8/2004 | Hurwood et al. | 707/2 |
| 6,775,675 | B1 | 8/2004 | Nwabueze | 707/100 |
| 6,782,421 | B1 | 8/2004 | Soles et al. | 709/223 |
| 6,785,675 | B1 | 8/2004 | Graves et al. | 1/1 |
| 6,789,046 | B1* | 9/2004 | Murstein et al. | 702/182 |
| 6,804,657 | B1 | 10/2004 | Sultan | 705/7.31 |
| 6,831,575 | B2 | 12/2004 | Wu et al. | 341/50 |
| 6,831,668 | B2 | 12/2004 | Cras | 715/853 |
| 6,842,176 | B2 | 1/2005 | Sang'Udi | 345/440 |
| 6,850,891 | B1 | 2/2005 | Forman | 705/7 |
| 6,854,091 | B1 | 2/2005 | Beaudoin | 715/854 |
| 6,859,798 | B1 | 2/2005 | Bedell et al. | 706/45 |
| 6,867,764 | B2 | 3/2005 | Ludtke | 345/173 |
| 6,868,087 | B1 | 3/2005 | Agarwala et al. | 370/412 |
| 6,874,126 | B1 | 3/2005 | Lapidous | 715/711 |
| 6,895,383 | B2 | 5/2005 | Heinrich | |
| 6,898,603 | B1 | 5/2005 | Petculescu | 707/101 |
| 6,900,808 | B2 | 5/2005 | Lassiter | 345/440 |
| 6,901,426 | B1 | 5/2005 | Powers et al. | 709/203 |
| 6,917,921 | B1 | 7/2005 | Cimral et al. | 705/7 |
| 6,959,306 | B2 | 10/2005 | Nwabueze | 707/104.1 |
| 6,963,826 | B2 | 11/2005 | Hanaman et al. | 703/2 |
| 6,968,312 | B1 | 11/2005 | Jordan | 705/7 |
| 6,973,616 | B1 | 12/2005 | Cottrille | 715/512 |
| 6,976,086 | B2 | 12/2005 | Sadeghi et al. | 709/236 |
| 6,988,076 | B2 | 1/2006 | Ouimet | 705/7 |
| 6,995,768 | B2 | 2/2006 | Jou | 345/440 |
| 7,013,285 | B1 | 3/2006 | Rebane | 705/10 |
| 7,015,911 | B2 | 3/2006 | Shaughnessy et al. | 345/440 |
| 7,027,051 | B2 | 4/2006 | Alford et al. | 345/440 |
| 7,043,524 | B2 | 5/2006 | Shah et al. | 709/203 |
| 7,058,638 | B2 | 6/2006 | Singh | 707/100 |
| 7,065,784 | B2 | 6/2006 | Hopmann et al. | 726/4 |
| 7,079,010 | B2 | 7/2006 | Champlin | 340/286.02 |
| 7,158,628 | B2 | 1/2007 | McConnell et al. | 379/265.02 |
| 7,181,417 | B1 | 2/2007 | Langseth et al. | 705/26 |
| 7,200,595 | B2 | 4/2007 | Dutta et al. | 1/1 |
| 7,216,116 | B1 | 5/2007 | Nilsson et al. | 1/1 |
| 7,222,308 | B2 | 5/2007 | Sauermann et al. | 715/833 |
| 7,224,847 | B2 | 5/2007 | Zhang et al. | |
| 7,249,120 | B2 | 7/2007 | Bruno et al. | 1/1 |
| 7,275,024 | B2 | 9/2007 | Yeh et al. | 703/2 |
| 7,302,421 | B2 | 11/2007 | Aldridge | 1/1 |
| 7,302,431 | B1 | 11/2007 | Apollonsky et al. | 1/1 |
| 7,302,444 | B1 | 11/2007 | Dunmore et al. | 1/1 |
| 7,313,561 | B2 | 12/2007 | Lo et al. | 1/1 |
| 7,340,448 | B2 | 3/2008 | Santosuosso | 1/1 |
| 7,349,862 | B2 | 3/2008 | Palmer et al. | 705/7 |
| 7,349,877 | B2 | 3/2008 | Ballow et al. | 705/36 R |
| 7,359,865 | B1 | 4/2008 | Connor et al. | 705/10 |
| 7,383,247 | B2 | 6/2008 | Li et al. | 1/1 |
| 7,398,240 | B2 | 7/2008 | Ballow et al. | 705/35 |
| 7,406,431 | B2 | 7/2008 | Spira et al. | 705/7 |
| 7,409,357 | B2 | 8/2008 | Schaf et al. | 705/7 |
| 7,412,398 | B1 | 8/2008 | Bailey | 705/10 |
| 7,433,876 | B2 | 10/2008 | Spivack et al. | 1/1 |
| 7,440,976 | B2 | 10/2008 | Hart et al. | 707/203 |
| 7,454,393 | B2 | 11/2008 | Horvitz et al. | 706/46 |
| 7,496,852 | B2 | 2/2009 | Eichorn et al. | 715/764 |
| 7,496,857 | B2 | 2/2009 | Stata et al. | 715/833 |
| 7,509,343 | B1 | 3/2009 | Washburn et al. | 707/104.1 |
| 7,523,466 | B2* | 4/2009 | DeAngelis | 719/313 |
| 7,546,226 | B1 | 6/2009 | Yeh et al. | 703/2 |
| 7,546,246 | B1 | 6/2009 | Stamm et al. | 705/7 |
| 7,548,912 | B2 | 6/2009 | Gideoni et al. | 1/1 |
| 7,559,023 | B2 | 7/2009 | Hays et al. | 715/255 |
| 7,568,217 | B1 | 7/2009 | Prasad et al. | 726/3 |
| 7,587,665 | B2 | 9/2009 | Crow et al. | 715/212 |
| 7,587,755 | B2 | 9/2009 | Kramer | 726/4 |
| 7,599,848 | B2 | 10/2009 | Wefers et al. | 705/7 |
| 7,613,625 | B2 | 11/2009 | Heinrich | 705/7 |
| 7,617,177 | B2 | 11/2009 | Bukary et al. | 1/1 |
| 7,617,187 | B2 | 11/2009 | Zhu et al. | 715/243 |
| 7,630,965 | B1 | 12/2009 | Erickson et al. | 1/1 |
| 7,634,478 | B2 | 12/2009 | Yang et al. | 1/1 |
| 7,636,709 | B1 | 12/2009 | Srikant et al. | |
| 7,640,506 | B2 | 12/2009 | Pratley et al. | 715/751 |
| 7,660,731 | B2 | 2/2010 | Chaddha et al. | 705/8 |
| 7,667,582 | B1 | 2/2010 | Waldorf | 340/440 |
| 7,685,207 | B1 | 3/2010 | Helms | 707/790 |
| 7,694,270 | B2 | 4/2010 | Manikotia et al. | 717/101 |
| 7,698,349 | B2 | 4/2010 | Hulen et al. | 707/805 |
| 7,702,554 | B2 | 4/2010 | Ballow et al. | 705/35 |
| 7,702,779 | B1* | 4/2010 | Gupta et al. | 709/224 |
| 7,707,490 | B2 | 4/2010 | Hays et al. | 715/234 |
| 7,716,253 | B2 | 5/2010 | Netz et al. | 707/803 |
| 7,716,278 | B2 | 5/2010 | Beringer et al. | 709/203 |
| 7,716,571 | B2 | 5/2010 | Tien et al. | 715/212 |
| 7,716,592 | B2 | 5/2010 | Tien et al. | 715/744 |
| 7,725,947 | B2 | 5/2010 | Bukary et al. | 726/30 |
| 7,730,023 | B2 | 6/2010 | MacGregor | 707/603 |
| 7,730,123 | B1 | 6/2010 | Erickson et al. | 709/203 |
| 7,730,129 | B2* | 6/2010 | Wang et al. | 719/329 |
| 7,739,148 | B2 | 6/2010 | Suzuki et al. | 705/26 |
| 7,747,572 | B2 | 6/2010 | Scott et al. | 707/636 |
| 7,752,094 | B2 | 7/2010 | Davidson et al. | 705/31 |
| 7,752,301 | B1 | 7/2010 | Maiocco et al. | 709/224 |
| 7,778,910 | B2 | 8/2010 | Ballow et al. | 705/36 R |
| 7,788,280 | B2 | 8/2010 | Singh et al. | 707/791 |
| 7,792,774 | B2 | 9/2010 | Friedlander et al. | 706/47 |
| 7,822,662 | B2 | 10/2010 | Guzik et al. | 705/35 |
| 7,831,464 | B2 | 11/2010 | Nichols et al. | 705/7.39 |
| 7,840,896 | B2 | 11/2010 | Tien et al. | 715/243 |
| 7,848,947 | B1 | 12/2010 | McGloin et al. | |
| 7,899,833 | B2 | 3/2011 | Stevens et al. | |
| 7,899,843 | B2 | 3/2011 | Dettinger et al. | |
| 7,904,797 | B2 | 3/2011 | Wong et al. | |
| 8,010,324 | B1 | 8/2011 | Crowe et al. | |
| 8,126,750 | B2 | 2/2012 | Tien et al. | |
| 8,190,992 | B2 | 5/2012 | Tien et al. | |
| 8,261,181 | B2 | 9/2012 | Tien et al. | |
| 8,321,805 | B2 | 11/2012 | Tien et al. | |
| 2001/0004256 | A1 | 6/2001 | Iwata et al. | 345/204 |
| 2001/0051835 | A1 | 12/2001 | Cline | 700/91 |

| Pub. No. | Date | Inventor | Class |
|---|---|---|---|
| 2001/0054046 A1 | 12/2001 | Mikhailov et al. | 707/500 |
| 2002/0029273 A1 | 3/2002 | Haroldson et al. | 709/226 |
| 2002/0038217 A1 | 3/2002 | Young | 705/1 |
| 2002/0049621 A1 | 4/2002 | Bruce | 705/7 |
| 2002/0052740 A1 | 5/2002 | Charlesworth | 704/220 |
| 2002/0052862 A1 | 5/2002 | Scott et al. | 707/1 |
| 2002/0059267 A1 | 5/2002 | Shah | 707/100 |
| 2002/0078175 A1 | 6/2002 | Wallace | 709/200 |
| 2002/0087272 A1 | 7/2002 | Mackie | 702/14 |
| 2002/0091737 A1 | 7/2002 | Markel | 707/513 |
| 2002/0099578 A1 | 7/2002 | Eicher et al. | 705/7 |
| 2002/0099678 A1 | 7/2002 | Albright et al. | 706/45 |
| 2002/0103976 A1 | 8/2002 | Steely et al. | 711/135 |
| 2002/0112171 A1 | 8/2002 | Ginter et al. | 713/185 |
| 2002/0133368 A1 | 9/2002 | Strutt et al. | 705/1 |
| 2002/0138659 A1* | 9/2002 | Trabaris et al. | 719/313 |
| 2002/0147803 A1 | 10/2002 | Dodd et al. | 709/223 |
| 2002/0161614 A1 | 10/2002 | Spira et al. | 705/7 |
| 2002/0169658 A1 | 11/2002 | Adler | 705/10 |
| 2002/0169799 A1 | 11/2002 | Voshell | 707/503 |
| 2002/0177784 A1 | 11/2002 | Shekhar | 600/519 |
| 2002/0178119 A1 | 11/2002 | Griffin et al. | 705/54 |
| 2002/0184043 A1 | 12/2002 | Lavorgna et al. | 705/1 |
| 2002/0184061 A1 | 12/2002 | Digate et al. | 705/7 |
| 2002/0188513 A1 | 12/2002 | Gil et al. | 705/22 |
| 2002/0194042 A1 | 12/2002 | Sands | 705/7 |
| 2002/0194090 A1 | 12/2002 | Gagnon et al. | 705/27 |
| 2002/0194329 A1 | 12/2002 | Alling | 709/224 |
| 2002/0198985 A1 | 12/2002 | Fraenkel et al. | 709/224 |
| 2003/0004742 A1 | 1/2003 | Palmer et al. | 705/1 |
| 2003/0009649 A1 | 1/2003 | Martin et al. | |
| 2003/0014290 A1 | 1/2003 | McLean et al. | 705/7 |
| 2003/0014488 A1* | 1/2003 | Dalal et al. | 709/204 |
| 2003/0028419 A1 | 2/2003 | Monaghan | 705/10 |
| 2003/0033191 A1 | 2/2003 | Davies et al. | 705/10 |
| 2003/0040936 A1 | 2/2003 | Nader et al. | 705/1 |
| 2003/0055731 A1 | 3/2003 | Fouraker et al. | 705/22 |
| 2003/0055927 A1 | 3/2003 | Fischer et al. | 709/221 |
| 2003/0061132 A1 | 3/2003 | Yu et al. | 705/30 |
| 2003/0065604 A1 | 4/2003 | Gatto | 705/36 |
| 2003/0065605 A1 | 4/2003 | Gatto | 705/36 |
| 2003/0069773 A1 | 4/2003 | Hladik et al. | 705/7 |
| 2003/0069824 A1 | 4/2003 | Menninger | 705/37 |
| 2003/0071814 A1 | 4/2003 | Jou et al. | 345/440 |
| 2003/0078830 A1 | 4/2003 | Wagner et al. | |
| 2003/0093423 A1 | 5/2003 | Larason et al. | 707/5 |
| 2003/0110249 A1 | 6/2003 | Buus et al. | 709/224 |
| 2003/0144868 A1 | 7/2003 | MacIntyre et al. | 705/1 |
| 2003/0146937 A1 | 8/2003 | Lee | 345/781 |
| 2003/0149696 A1 | 8/2003 | Nelson et al. | |
| 2003/0182181 A1 | 9/2003 | Kirkwood | 705/11 |
| 2003/0187675 A1 | 10/2003 | Hack | 705/1 |
| 2003/0195878 A1 | 10/2003 | Neumann | 707/3 |
| 2003/0204430 A1 | 10/2003 | Kalmick et al. | 705/8 |
| 2003/0204487 A1 | 10/2003 | Sssv | 707/1 |
| 2003/0212960 A1 | 11/2003 | Shaughnessy et al. | 715/526 |
| 2003/0225604 A1 | 12/2003 | Casati et al. | 705/7 |
| 2003/0226107 A1 | 12/2003 | Pelegri-Llopart | 707/501.1 |
| 2003/0236732 A1 | 12/2003 | Cimral et al. | 705/36 |
| 2004/0021695 A1 | 2/2004 | Sauermann et al. | 345/789 |
| 2004/0030741 A1 | 2/2004 | Wolton et al. | 709/202 |
| 2004/0030795 A1 | 2/2004 | Hesmer et al. | 709/231 |
| 2004/0033475 A1 | 2/2004 | Mizuma et al. | 434/219 |
| 2004/0044665 A1 | 3/2004 | Nwabueze | 707/9 |
| 2004/0044678 A1 | 3/2004 | Kalia et al. | 707/102 |
| 2004/0059518 A1 | 3/2004 | Rothschild | 702/18 |
| 2004/0064293 A1 | 4/2004 | Hamilton et al. | 702/182 |
| 2004/0066782 A1* | 4/2004 | Nassar | 370/389 |
| 2004/0068429 A1 | 4/2004 | MacDonald | 705/10 |
| 2004/0068431 A1 | 4/2004 | Smith et al. | 705/10 |
| 2004/0083246 A1 | 4/2004 | Kahlouche et al. | 708/105 |
| 2004/0093396 A1 | 5/2004 | Phelan et al. | 705/36 R |
| 2004/0102926 A1 | 5/2004 | Adendorff | 702/182 |
| 2004/0117731 A1 | 6/2004 | Blyashov | 715/507 |
| 2004/0119752 A1 | 6/2004 | Beringer et al. | 345/779 |
| 2004/0128150 A1 | 7/2004 | Lundegren | 705/1 |
| 2004/0135825 A1 | 7/2004 | Brosnan | 345/860 |
| 2004/0138944 A1 | 7/2004 | Whitacre | 705/11 |
| 2004/0162772 A1 | 8/2004 | Lewis | 705/34 |
| 2004/0164983 A1 | 8/2004 | Khozai | 345/440 |
| 2004/0172323 A1 | 9/2004 | Stamm | 705/10 |
| 2004/0183800 A1 | 9/2004 | Peterson | 345/440 |
| 2004/0199541 A1* | 10/2004 | Goldberg et al. | 707/104.1 |
| 2004/0204913 A1 | 10/2004 | Mueller et al. | 702/188 |
| 2004/0210574 A1 | 10/2004 | Aponte et al. | 707/5 |
| 2004/0212636 A1 | 10/2004 | Stata et al. | 345/703 |
| 2004/0215626 A1 | 10/2004 | Colossi et al. | 715/500 |
| 2004/0225571 A1 | 11/2004 | Urali | 705/26 |
| 2004/0225955 A1 | 11/2004 | Ly | 715/500 |
| 2004/0230463 A1 | 11/2004 | Boivin | 705/7 |
| 2004/0230471 A1 | 11/2004 | Putnam | 705/10 |
| 2004/0249482 A1 | 12/2004 | Abu El Ata et al. | 700/44 |
| 2004/0249657 A1 | 12/2004 | Kol et al. | 705/1 |
| 2004/0252134 A1 | 12/2004 | Bhatt et al. | 345/619 |
| 2004/0254806 A1 | 12/2004 | Schwerin-Wenzel et al. | 705/1 |
| 2004/0254860 A1 | 12/2004 | Wagner et al. | 705/27 |
| 2004/0260582 A1 | 12/2004 | King | 705/7 |
| 2004/0260717 A1 | 12/2004 | Albornoz et al. | 707/102 |
| 2004/0268228 A1 | 12/2004 | Croney et al. | 715/255 |
| 2005/0004781 A1 | 1/2005 | Price et al. | 702/188 |
| 2005/0012743 A1 | 1/2005 | Kapler et al. | 345/419 |
| 2005/0015732 A1* | 1/2005 | Vedula et al. | 715/810 |
| 2005/0039119 A1 | 2/2005 | Parks et al. | 715/515 |
| 2005/0041872 A1 | 2/2005 | Yim et al. | |
| 2005/0049831 A1 | 3/2005 | Lilly | 702/182 |
| 2005/0049894 A1 | 3/2005 | Cantwell et al. | 705/1 |
| 2005/0055257 A1 | 3/2005 | Senturk et al. | 705/8 |
| 2005/0060048 A1 | 3/2005 | Pierre | 700/28 |
| 2005/0060300 A1 | 3/2005 | Stolte et al. | |
| 2005/0060325 A1 | 3/2005 | Bakalash | 707/100 |
| 2005/0065754 A1 | 3/2005 | Schaf et al. | |
| 2005/0065811 A1 | 3/2005 | Chu et al. | |
| 2005/0065925 A1 | 3/2005 | Weissman et al. | 707/4 |
| 2005/0065930 A1 | 3/2005 | Swaminathan et al. | |
| 2005/0065967 A1 | 3/2005 | Schuetze et al. | 707/102 |
| 2005/0071680 A1 | 3/2005 | Bukary et al. | 713/201 |
| 2005/0071737 A1 | 3/2005 | Adendorff | 715/500 |
| 2005/0091093 A1 | 4/2005 | Bhaskaran | 705/7 |
| 2005/0091253 A1 | 4/2005 | Cragun | 707/102 |
| 2005/0091263 A1 | 4/2005 | Wallace | 707/102 |
| 2005/0097438 A1 | 5/2005 | Jacobson | 715/500.1 |
| 2005/0097517 A1 | 5/2005 | Goin et al. | 717/124 |
| 2005/0108271 A1 | 5/2005 | Hurmiz et al. | 715/202 |
| 2005/0114241 A1 | 5/2005 | Hirsch | 705/35 |
| 2005/0114801 A1 | 5/2005 | Yang | 715/961 |
| 2005/0144022 A1 | 6/2005 | Evans | 705/1 |
| 2005/0149558 A1 | 7/2005 | Zhuk | 707/104.1 |
| 2005/0149852 A1 | 7/2005 | Bleicher | 715/501.1 |
| 2005/0154628 A1 | 7/2005 | Eckart et al. | 705/10 |
| 2005/0154635 A1 | 7/2005 | Wright et al. | 705/11 |
| 2005/0154769 A1 | 7/2005 | Eckart et al. | 707/201 |
| 2005/0160356 A1 | 7/2005 | Albornoz | 715/512 |
| 2005/0171835 A1 | 8/2005 | Mook | 705/11 |
| 2005/0181835 A1 | 8/2005 | Lau et al. | 455/567 |
| 2005/0197946 A1 | 9/2005 | Williams et al. | 705/36 |
| 2005/0198042 A1 | 9/2005 | Davis | 707/10 |
| 2005/0203876 A1 | 9/2005 | Cragun et al. | 707/3 |
| 2005/0209943 A1 | 9/2005 | Ballow et al. | 705/35 |
| 2005/0209945 A1 | 9/2005 | Ballow et al. | 705/35 |
| 2005/0209946 A1 | 9/2005 | Ballow et al. | 705/35 |
| 2005/0209948 A1* | 9/2005 | Ballow et al. | 705/36 |
| 2005/0210052 A1 | 9/2005 | Aldridge | 707/101 |
| 2005/0216831 A1 | 9/2005 | Guzik | 715/513 |
| 2005/0223021 A1 | 10/2005 | Batra et al. | |
| 2005/0228880 A1 | 10/2005 | Champlin | 709/224 |
| 2005/0240467 A1 | 10/2005 | Eckart | 705/10 |
| 2005/0240898 A1 | 10/2005 | Manikotia et al. | 717/101 |
| 2005/0251432 A1 | 11/2005 | Barker et al. | |
| 2005/0253874 A1 | 11/2005 | Lal et al. | |
| 2005/0256825 A1 | 11/2005 | Dettinger | 707/1 |
| 2005/0262051 A1 | 11/2005 | Dettinger et al. | 707/3 |
| 2005/0262451 A1 | 11/2005 | Remingnanti et al. | 715/833 |
| 2005/0272022 A1 | 12/2005 | Montz, Jr. et al. | 434/322 |
| 2005/0273762 A1 | 12/2005 | Lesh | 715/115 |
| 2005/0289452 A1 | 12/2005 | Kashi | 715/512 |
| 2006/0004555 A1 | 1/2006 | Jones | 703/6 |
| 2006/0004731 A1 | 1/2006 | Seibel et al. | 707/3 |
| 2006/0009990 A1 | 1/2006 | McCormick | 705/1 |

| | | | |
|---|---|---|---|
| 2006/0010032 A1 | 1/2006 | Eicher et al. ............... 705/10 |
| 2006/0010164 A1 | 1/2006 | Netz et al. ............... 707/104.1 |
| 2006/0015424 A1 | 1/2006 | Esposito et al. |
| 2006/0020531 A1 | 1/2006 | Veeneman et al. ............... 705/35 |
| 2006/0026179 A1 | 2/2006 | Brown et al. ............... 707/100 |
| 2006/0036455 A1 | 2/2006 | Prasad ............... 715/1 |
| 2006/0036595 A1 | 2/2006 | Gilfix et al. ............... 707/5 |
| 2006/0047419 A1 | 3/2006 | Diendorf et al. ............... 701/208 |
| 2006/0047711 A1* | 3/2006 | Cho et al. ............... 715/751 |
| 2006/0059107 A1 | 3/2006 | Elmore et al. ............... 705/64 |
| 2006/0074789 A1* | 4/2006 | Capotosto et al. ............... 705/35 |
| 2006/0080156 A1 | 4/2006 | Baughn et al. ............... 705/7 |
| 2006/0085444 A1 | 4/2006 | Sarawgi et al. ............... 707/100 |
| 2006/0089868 A1 | 4/2006 | Griller et al. ............... 705/10 |
| 2006/0089894 A1 | 4/2006 | Balk et al. ............... 705/35 |
| 2006/0089939 A1 | 4/2006 | Broda et al. ............... 707/100 |
| 2006/0095276 A1 | 5/2006 | Axelrod et al. ............... 705/1 |
| 2006/0095915 A1 | 5/2006 | Clater ............... 718/100 |
| 2006/0111921 A1 | 5/2006 | Chang et al. ............... 705/1 |
| 2006/0112123 A1 | 5/2006 | Clark et al. ............... 707/101 |
| 2006/0112130 A1 | 5/2006 | Lowson ............... 707/102 |
| 2006/0123022 A1 | 6/2006 | Bird ............... 707/100 |
| 2006/0136830 A1 | 6/2006 | Martlage et al. ............... 715/745 |
| 2006/0154692 A1 | 7/2006 | Ikehara et al. ............... 455/556.2 |
| 2006/0161471 A1 | 7/2006 | Hulen et al. ............... 705/10 |
| 2006/0161596 A1 | 7/2006 | Chan et al. ............... 707/201 |
| 2006/0167704 A1 | 7/2006 | Nicholls et al. ............... 705/1 |
| 2006/0178897 A1 | 8/2006 | Fuchs ............... 705/1 |
| 2006/0178920 A1 | 8/2006 | Muell ............... 705/8 |
| 2006/0195424 A1 | 8/2006 | Wiest et al. ............... 707/3 |
| 2006/0206392 A1 | 9/2006 | Rice, Jr. et al. ............... 705/26 |
| 2006/0224325 A1 | 10/2006 | Conway et al. ............... 702/19 |
| 2006/0229925 A1 | 10/2006 | Chalasani et al. ............... 705/8 |
| 2006/0230234 A1 | 10/2006 | Bentolila et al. ............... 711/133 |
| 2006/0233348 A1 | 10/2006 | Cooper ............... 379/265.06 |
| 2006/0235732 A1 | 10/2006 | Miller et al. ............... 705/7 |
| 2006/0235778 A1 | 10/2006 | Razvi et al. ............... 705/35 |
| 2006/0253475 A1 | 11/2006 | Stewart et al. ............... 707/100 |
| 2006/0259338 A1 | 11/2006 | Rodrigue et al. ............... 705/7 |
| 2006/0265377 A1 | 11/2006 | Raman et al. ............... 707/9 |
| 2006/0271583 A1 | 11/2006 | Hulen et al. ............... 707/102 |
| 2006/0277128 A1 | 12/2006 | Anandarao et al. |
| 2006/0282819 A1 | 12/2006 | Graham et al. ............... 717/113 |
| 2006/0288211 A1 | 12/2006 | Vargas et al. ............... 713/170 |
| 2007/0021992 A1 | 1/2007 | Konakalla ............... 705/7 |
| 2007/0022026 A1 | 1/2007 | Davidson et al. ............... 705/31 |
| 2007/0033129 A1 | 2/2007 | Coates ............... 705/36 R |
| 2007/0038934 A1 | 2/2007 | Fellman ............... 715/700 |
| 2007/0050237 A1 | 3/2007 | Tien et al. ............... 705/11 |
| 2007/0055564 A1 | 3/2007 | Fourman ............... 705/11 |
| 2007/0055688 A1 | 3/2007 | Blattner ............... 707/102 |
| 2007/0067381 A1 | 3/2007 | Grant et al. ............... 709/200 |
| 2007/0112607 A1 | 5/2007 | Tien et al. ............... 705/7 |
| 2007/0143161 A1 | 6/2007 | Tien et al. ............... 705/7 |
| 2007/0143174 A1 | 6/2007 | Tien et al. ............... 705/11 |
| 2007/0143175 A1 | 6/2007 | Tien et al. ............... 705/11 |
| 2007/0156680 A1 | 7/2007 | Tien et al. ............... 707/6 |
| 2007/0162500 A1* | 7/2007 | Herwadkar ............... 707/104.1 |
| 2007/0168323 A1 | 7/2007 | Dickerman et al. ............... 707/2 |
| 2007/0174330 A1 | 7/2007 | Fox et al. ............... 707/102 |
| 2007/0192170 A1* | 8/2007 | Cristol ............... 719/329 |
| 2007/0225986 A1 | 9/2007 | Bowe et al. ............... 705/1 |
| 2007/0234198 A1 | 10/2007 | Tien et al. ............... 715/512 |
| 2007/0239508 A1 | 10/2007 | Fazal et al. ............... 705/8 |
| 2007/0239573 A1 | 10/2007 | Tien et al. ............... 705/35 |
| 2007/0239660 A1 | 10/2007 | Tien et al. ............... 707/2 |
| 2007/0254740 A1 | 11/2007 | Tien et al. ............... 463/42 |
| 2007/0255681 A1 | 11/2007 | Tien et al. ............... 707/2 |
| 2007/0260625 A1 | 11/2007 | Tien et al. ............... 707/101 |
| 2007/0265863 A1 | 11/2007 | Tien et al. ............... 705/1 |
| 2007/0266042 A1 | 11/2007 | Hsu et al. ............... 707/102 |
| 2007/0282673 A1 | 12/2007 | Nagpal et al. ............... 705/1 |
| 2008/0005064 A1 | 1/2008 | Sarukkai ............... 707/3 |
| 2008/0040309 A1 | 2/2008 | Aldridge ............... 707/1 |
| 2008/0059441 A1 | 3/2008 | Gaug et al. ............... 707/4 |
| 2008/0066010 A1* | 3/2008 | Brodersen et al. ............... 715/810 |
| 2008/0086345 A1 | 4/2008 | Wilson et al. ............... 705/7 |
| 2008/0086359 A1 | 4/2008 | Holton et al. ............... 705/10 |
| 2008/0109270 A1 | 5/2008 | Shepherd et al. ............... 705/7 |
| 2008/0115103 A1 | 5/2008 | Datars et al. ............... 717/101 |
| 2008/0140623 A1 | 6/2008 | Tien et al. ............... 707/3 |
| 2008/0162209 A1 | 7/2008 | Gu et al. ............... 705/7 |
| 2008/0162210 A1 | 7/2008 | Gu et al. ............... 705/7 |
| 2008/0163066 A1 | 7/2008 | Gu et al. ............... 715/738 |
| 2008/0163099 A1 | 7/2008 | Gu et al. ............... 715/780 |
| 2008/0163125 A1 | 7/2008 | Gu et al. ............... 715/853 |
| 2008/0163164 A1 | 7/2008 | Chowdhary et al. ............... 717/106 |
| 2008/0168376 A1 | 7/2008 | Tien et al. ............... 715/772 |
| 2008/0172287 A1 | 7/2008 | Tien et al. ............... 705/10 |
| 2008/0172348 A1 | 7/2008 | Tien et al. ............... 706/12 |
| 2008/0172414 A1 | 7/2008 | Tien et al. ............... 707/104.1 |
| 2008/0172629 A1 | 7/2008 | Tien et al. ............... 715/771 |
| 2008/0183564 A1 | 7/2008 | Tien et al. ............... 705/11 |
| 2008/0184099 A1 | 7/2008 | Tien et al. ............... 715/209 |
| 2008/0184130 A1 | 7/2008 | Tien et al. ............... 715/745 |
| 2008/0189632 A1 | 8/2008 | Tien et al. ............... 715/764 |
| 2008/0229214 A1* | 9/2008 | Hamilton et al. ............... 715/751 |
| 2008/0243597 A1 | 10/2008 | Ballow et al. ............... 705/11 |
| 2008/0288889 A1* | 11/2008 | Hunt et al. ............... 715/810 |
| 2009/0300110 A1 | 12/2009 | Chene et al. ............... 709/203 |
| 2010/0262659 A1 | 10/2010 | Christiansen et al. ............... 709/205 |
| 2012/0150905 A1 | 6/2012 | Tien et al. |

FOREIGN PATENT DOCUMENTS

| | | |
|---|---|---|
| WO | WO 97/31320 A1 | 8/1997 |
| WO | WO 01/01206 A2 | 1/2001 |
| WO | WO 01/65349 A1 | 9/2001 |
| WO | WO 01/69421 A2 | 9/2001 |
| WO | WO 01/69421 A3 | 9/2001 |
| WO | WO 03/037019 A1 | 5/2003 |
| WO | WO 01/01206 A3 | 1/2004 |
| WO | WO 2004/114177 A2 | 12/2004 |
| WO | WO 2004/114177 A3 | 12/2004 |
| WO | WO 2005/062201 A1 | 7/2005 |
| WO | WO 2005/072410 A2 | 8/2005 |
| WO | WO 2005/101233 A1 | 10/2005 |

OTHER PUBLICATIONS

Oracle Collaboration Suite Metric Reference Manual 10g Release 2 (10.2), Oracle, 2006, pp. 1-544.*

"Developing a Framework for Integrating Prior Problem Solving and Kknowledge Sharing Histories of a Group to Predict Future Group Performance", Ron Stevens, 2005, pp. 1-9.*

Kraynak, "Absolute Beginner's Guide to Microsoft Office Excel 2003", Que, Sep. 2003, 32 pp.

John Wiley et al., "Power Point All-in-One Desk Reference for Dummies," Jan. 10, 2007.

U.S. Official Action mailed Oct. 21, 2009 in U.S. Appl. No. 11/280,548.

U.S. Official Action mailed Dec. 8, 2009 in U.S. Appl. No. 11/393,335.

U.S. Official Action mailed Dec. 14, 2009 in U.S. Appl. No. 11/393,019.

U.S. Official Action mailed Dec. 28, 2009 in U.S. Appl. No. 11/624,171.

U.S. Official Action mailed Jan. 15, 2010 in U.S. Appl. No. 11/408,450.

U.S. Official Action mailed Dec. 24, 2008 in U.S. Appl. No. 11/624,171.

IndicatorBarometer; retrieved from <http://www.aiqsystems.com/docs/ref_7.pdf>, archived Oct. 15, 2004.

U.S. Official Action mailed Jan. 22, 2010 in U.S. Appl. No. 11/039,714.

U.S. Official Action mailed Feb. 3, 2010 in U.S. Appl. No. 11/668,530.

U.S. Office Action dated Feb. 18, 2009 cited in U.S. Appl. No. 11/412,434.

Chien et al., XML Document Versioning, SIGMOND Record, vol. 30, No. 3, Sep. 2001.

U.S. Official Action mailed Mar. 17, 2010 in U.S. Appl. No. 11/280,548.

U.S. Official Action mailed Mar. 25, 2010 in U.S. Appl. No. 11/393,115.

U.S. Official Action mailed Mar. 30, 2010 in U.S. Appl. No. 11/313,390.
U.S. Official Action mailed Mar. 31, 2010 in U.S. Appl. No. 11/313,327.
U.S. Official Action mailed Apr. 1, 2010 in U.S. Appl. No. 11/313,899.
U.S. Official Action mailed Apr. 7, 2010 in U.S. Appl. No. 11/412,499.
Cognos Incorporated, "Scorecarding with Cognos Metrics Manager," Oct. 2004.
Charles Bloomfield, "Bringing the Balanced Scorecard to Life: The Microsoft Balanced Scorecard Framework," Microsoft Corporation White Paper, May 2002.
Mulins, Craig S., "Distributed Query Optimization Technical Support", Jul. 1996.
Callen, Daniel J. et al., "Consolidation of Query Results in a Multidatabase Environment: An Object Oriented Approach" IEEE, 1996.
U.S. Official Action mailed Apr. 14, 2010 in U.S. Appl. No. 11/313,324.
U.S. Official Action mailed Apr. 15, 2010 in U.S. Appl. No. 11/412,458.
U.S. Official Action mailed Apr. 23, 2010 in U.S. Appl. No. 11/214,678.
U.S. Official Action mailed May 12, 2010 in U.S. Appl. No. 11/624,171.
U.S. Official Action mailed May 28, 2009 in U.S. Appl. No. 11/280,548.
U.S. Official Action mailed Jun. 3, 2009 in U.S. Appl. No. 11/393,335.
U.S. Official Action mailed May 26, 2010 in U.S. Appl. No. 11/393,335.
U.S. Official Action mailed May 26, 2010 in U.S. Appl. No. 11/668,520.
U.S. Official Action mailed May 28, 2009 in U.S. Appl. No. 11/214,678.
U.S. Official Action mailed Jun. 19, 2009 in U.S. Appl. No. 11/408,450.
U.S. Official Action mailed Jul. 21, 2010 in U.S. Appl. No. 11/039,714.
U.S. Official Action mailed Aug. 6, 2009 in U.S. Appl. No. 11/668,520.
U.S. Official Action mailed Aug. 19, 2009 in U.S. Appl. No. 11/393,115.
U.S. Official Action mailed Sep. 1, 2009 in U.S. Appl. No. 11/412,434.
U.S. Official Action mailed Sep. 2, 2009 in U.S. Appl. No. 11/624,171.
U.S. Official Action mailed Sep. 30, 2009 in U.S. Appl. No. 11/214,678.
"Business Analysis with OLAP", Netways, http://www.netways.com/newsletter.olap.html, printed Mar. 7, 2006, 3 pp.
"Centralization and Optimization of Performance Metrics, Data Sources, and Analysis Activities", 2005 Computerworld Honors Case Study, http://www.cwhonors.org/laureates/Business/20055240.pdf, printed Mar. 7, 2006, 4 pp.
"Chapter 13—OLAP Services", SQL Server 7.0 Resource Guide, 2006 Microsoft Corporation, http://www.microsoft.com/technet/prodtechnol/sql/70/reskit/part9/sqc12.mspx, printed Mar. 6, 2006, 18 pp.
"Cognos 8 Business Intelligence Overview", Cognos Incorporated, http://www.cognos.com/products/cognos8businessintelligence/index.html, printed Jan. 11, 2006, 1 pp.
"CorVu Products", Seabrook, http://www.seabrook.ie/corvu.htm#corvurapidscorecard, printed Mar. 7, 2006, 3 pp.
"Enhanced Vendor Scorecards Vendor Documentation", Publix Super Markets, Inc., copyright 2003, revised date Feb. 9, 2004, http://my.datexx.com/www/customer/p14/Vendor%20EVS%20Documentation.pdf, 25 pp.
"Epicor Vantage: Introducing the Next Generation Global Enterprise Resource Planning Software", Epicor Vantage, http://www.scala.com.cn/downloads/vantage/vantage_60_page.pdf, printed Jan. 12, 2006, 60 pp.

"Extend Business Scorecard Manager 2005", ProClarity, http://www.proclarity.com/products/clients_scorecardmanager.asp, printed Jan. 11, 2006, 2 pp.
"Microsoft Office Business Scorecard Manager 2005 Overview and Benefits", Microsoft Corporation, http://www.office.microsoft.com/en-us/assistance/HA012225141033.aspx, printed Jan. 11, 2006, 3 pp.
"MicroStrategy: Best in Business Intelligence", MicroStrategy Inc., http://www.microstrategy.com/Software/Products/User-Interfaces/Web, printed Jan. 11, 2006, 3 pp.
"OutlookSoft CPM: A Unified Corporate Performance Management Solution", OutlookSoft Corporation, http://www.outlooksoft.com/product.index.htm, printed Jan. 11, 2006, 2 pp.
"SBM Solutions: Product Guide", SBM Associates, http://www.productcosting.com/prodguide.htm, printed Feb. 28, 2006, 1 pp.
"Scorecarding with Cognos® Metrics Manager", Congros, http://www.cognos.com/pdfs/factsheets/fs_scorcarding_with_cognos_metricsmanager.pdf, printed Mar. 7, 2006, 4 pp.
Badii, Atta et al., "Information Management and Knowledge Integration for Enterprise Innovation", Logistics Information Management, vol. 16, No. 2, 2003, http://www.emeraldinsight.com/Insight/ViewContentServlet?Filename=Published/EmeraldFullTextArticle/Pdf/0880160205.pdf, pp. 145-155.
Bajwa, Deepinder S. et al., "An Empirical Assessment of the Adoption and Use of Collaboration Information Technologies in the U.S., Australia, and Hong Kong", http://dsslab.sims.monash.edu,au/dss2004/proceedings/pdf/07_Bajwa_Lewis_Pervan_Lai.pdf, printed Jan. 12, 2006, copyright 2004, pp. 60-69.
Bird, Steven et al., "Annotation Graphs as a Framework for Multidimensional Linguistic Data Analysis", http:///acl.ldc.upenn.educ/W/W99/W99-0301.pdf, printed Jan. 12, 2006, pp. 1-10.
Calame, Paul et al., "Cockpit: Decision Support Tool for Factory Operations and Supply Chain Management", Intel Technology Journal Q1, 2000 Intel Corporation, http://developer.intel.com/technology/itj/q12000/pdf.cockpit.pdf, pp. 1-13.
Elmanova, Natalia, "Implementing OLAP In Delphi Applications", http://www.only4gurus.net/miscellaneous/implementing_olap_in_delphi_a.doc, printed Mar. 6, 2006, 19 pp.
Ferguson, Mike, "Conquering CPM and Business Intelligence", Business Intelligence.com, ITNews265, http://www.businessintelligence.com/ex/asp.code.21/xe/article.htm, printed Jan. 11, 2006, 6 pp.
Lebow, David G. et al., "HyLighter: An Effective Interactive Annotation Innovation for Distance Education", http://wwwuwex.edu/disted/conference/Resource_library/proceedings/04_1344.pdf, printed Jan. 12, 2006, 5 pp.
Rother, Kristian et al., "Multidimensional Data Integration of Protein Annotations", Springer-Verlag GmbH, http://www.springerlink.com/(3riocx450rr2iv55x2txum55)/app/home/contribution.asp?referrer=parent&
backto=issue,11,15;journa1,827,2337;linkingpublicationresults,1: 105633,1, printed Jan. 12, 2006, 2 pp.
Sanders, Paul, "SQL Server 2005: Real-Time Business Intelligence Using Analysis Services", Microsoft Corporation, Apr. 1, 2005, http://www.microsoft.com/technet/prodtechnol/sql/2005/rtbissas.mspx, printed Jan. 11, 2006, 9 pp.
Zaidi, Omar et al., "Data Center Consolidation: Using Performance Metrics to Achieve Success", http://searchnetworking.techtarget.com/searchNetworking/Downloads/IV_INS_DataCenter_Consolidation_WP.pdf, printed Jan. 12, 2006, 10 pp.
Acharya, Sharad, "Pattern Language for Data Driven Presentation Layer for Dynamic and Configurable Web Systems," Version: Conference Draft, Jul. 26, 2004, pp. 1-33, http://hillside.net/plop/2004/papers/sacharya0/PLoP2004_sacharya0_0.pdf
"Data Driven Components," Java Developers Journal, SYS-CON Media, Inc. 2004, http://www2.sys-con.com/itsg/virtualcd/Java/archives/0405/hyrkas/index.html, 7 pp.
"Hyperion Intelligence Desktop, Plugin, and HTML Client Products," Hyperion™ Developer Network, http://dev.hyperion.com/resource_library/articles/intelligence_desktop_article.cfm, 7 pp., Oct. 20, 2006.

"BusinessObjects Enterprise 6," An End-to-End Overview, White Paper., http://www.spain.businessobjects.com/global/pdf/products/queryanalysis/wp_e6_overview.pdf, 20 pp., 2003.

"Cognos 8 Business Intelligence—Dashboards," COGNOS® The Next Level of Performance, http://www.cognos.com/products/cognos8businessintelligence/dashboards.html, 2 pp., Oct. 20, 2006.

"Microsoft Builds Business Intelligence Into Office Software," Microsoft PressPass—Information for Journalists, http://www.microsoft.com/presspass/press/2005/oct05/10-23BiLalunchPR.mspx, 4 pp.

"Hyperion System 9 BI+Enterprise Metrics," A Hyperion Data Sheet, Hyperion Solutions Corporation Worldwide Headquarters, Oct. 2006, http://www.hyperion.com/products/resource_library/product_collateral/EnterpriseMetrics.pdf, pp. 1-2.

"Products: PilotWorks," Products: PilotWorks—Scorecard, 2006 Pilot Software, pp. 1-3.

Batista, Gustavo E.A.P.A.; Monard, Maria Carolina; "An Analysis of Four Missing Data Treatment Methods for Supervised Learning," University of Sao Paulo, Institute of Mathematics and Computer Science (ICMC), http://coblitz.codeen.org:3125/citeseer.ist.psu.edu/cache/papers/cs/27545/http:zSzzSzwww.icmc.usp.brzSz~gbatistazSzpdfszSzaai2003.pdf/batista03analysis.pdf, 12 pp., 2003.

"Crystal Xcelsius Workgroup." http://www.xcelsius.com/Products/Enterprise_feastures.html, 3 pp., Oct. 31, 2006.

"Reporting and Dashboards with Cognos 8 Business Intelligence," Cognos, The Next Level of Intelligence, http://www.cognos.com/pdfs/whitepapers/wp_reporting_and_dashboards_with_c8bi.pdf, pp. 1-16, 2008.

"BusinessObjects Plan Dashboarding XI for Retail," BusinessObjects, http://www.businessobjects.com/pdf/products/planning/plan_dashboarding_rt.pdf, 2 pp., 2006.

"SAS® Risk Intelligence Offerings, Risk Reporting; Data Integration; Internal Risk Ratings; Credit Risk; Market Risk; Operational Risk", http://www.sas.com/industry/fsi/risk/brochure2.pdf, 12 pp., 2006.

Tenhunen, Jarkko; Ukko, Juhani; Markus, Tapio; Rantanen, Hannu; "Applying Balanced Scorecard Principles On the SAKE-System: Case Telekolmio Oy," Lappeenranta University of Technology (Department of Industrial Engineering and Management); Telekolmio Oy (Finland). http://www.lut.fi/tuta/lahti/sake/IWPM2003a.pdf, 11 pp., 2003.

Kleijnen, Jack; Smits, Martin T.; "Performance Metrics in Supply Chain Management," Tilburg University, The Netherlands, Department of Information Systems and Management. http://center.kub.nl/staff/kleijnen/jors-proofs.pdf, 8 pp., 2003.

Martinsons, Maris; Davison, Robert; Tse, Dennis; "The Balanced Scorecard: A Foundation for the Strategic Management of Information Systems," University of Hong Kong, Sep. 28, 1998. http://teaching.fec.anu.edu.au/BUSN7040/Articles/Martinsons%20et%20al%201999%20DSS%20the%20balanced%20scorecard.pdf, 18 pp.

U.S. Office Action mailed Jul. 25, 2008 cited in U.S. Appl. No. 11/412,434.

U.S. Office Action mailed Sep. 5, 2008 cited in U.S. Appl. No. 11/280,548.

U.S. Office Action dated Nov. 24, 2008 cited in U.S. Appl. No. 11/214,678.

Ergometrics.com Web Pages, Ergometrics, Feb.-Mar. 2000, Retrieved from Archive.org Jan. 25, 2007.

Arnold, Tom, Dashboard & Scorecard Software—Tools for Operations Management and Strategy Deployment, Sep. 18, 2002.

iDashes.net Web Pages, iDashes, Inc., May 2001, Retrieved from Archive.org Jan. 25, 2007.

IBM WebSphere: Chapter 6—Working with WebSphere Business Modeler, cited in U.S. Appl. No. 11/313,390 in OA dated Sep. 1, 2010, 20 pgs.

U.S. Official Action mailed Aug. 4, 2010 in U.S. Appl. No. 11/280,548.

U.S. Official Action mailed Aug. 5, 2010 in U.S. Appl. No. 11/412,458.

U.S. Official Action mailed Aug. 10, 2010 in U.S. Appl. No. 11/623,818.

U.S. Official Action mailed Aug. 30, 2010 in U.S. Appl. No. 11/313,327.

U.S. Official Action mailed Sep. 1, 2010 in U.S. Appl. No. 11/313,390.

U.S. Official Action mailed Sep. 9, 2010 in U.S. Appl. No. 11/412,499.

U.S. Official Action mailed Sep. 29, 2010 in U.S. Appl. No. 11/313,324.

U.S. Official Action mailed Oct. 6, 2010 in U.S. Appl. No. 11/313,899.

U.S. Official Action mailed Oct. 12, 2010 in U.S. Appl. No. 11/623,953.

Monson et al., "IBM Workplace for Business Controls and Reporting: Administration and Operations Best Practices", IBM Redpaper, Oct. 2005, pp. 1-240.

"Cognos Business Intelligence Series 7, Cognos Impromptu (2006), Mastering Impromptu Reports", Cognos Incorporated, pp. 1-154.

"Cognos Series 7 PowerPlay Transformer", (2003), Installation Guide, Cognos Incorporated, pp. 1-62.

"Cognos Business Intelligence Series Cognos PowerPlay for Windows (2006), Discovering PowerPlay", Cognos Incorporated, pp. 1-74.

"Cognos Business Intelligence Series 7 PowerPlay for Windows", (2006), PowerPlay User Guide, Cognos Incorporated, pp. 1-230.

"Epicor Vantage: Introducing the Next Generation Global Enterprise Resource Planning Software", Epicore Vantage, http://m.scala.com.cn downloads/vantage/vantage6Oage.pdf, printed Jan. 12, 2006, 60 pgs.

T. E. Graedel et al., "Hierarchical Metrics for Sustainability", Environmental Quality Management, Winter, 2002, vol. 12 Issue 12, pp. 21-30, Retrieved from Business Source Complete Database.

U.S. Official Action mailed Nov. 5, 2010 in U.S. Appl. No. 11/393,335.

U.S. Official Action mailed Nov. 10, 2010 in U.S. Appl. No. 11/624,122.

U.S. Official Action mailed Nov. 10, 2010 in U.S. Appl. No. 11/668,763.

U.S. Official Action mailed Nov. 24, 2010 in U.S. Appl. No. 11/670,444.

U.S. Official Action mailed Nov. 29, 2010 in U.S. Appl. No. 11/668,520.

U.S. Official Action mailed Dec. 8, 2010 in U.S. Appl. No. 11/214,678.

"SYSPRO Offers Executive Dashboard with SYSPRO e.net Solutions"; Business Wire, Oct. 11, 2004.

Park et al., Role-Based Access Control on the Web; ACM Transactions on Information and System Security, vol. 4, No. 1, Feb. 2001.

"Microsoft Office Business Scorecard Manager"; Microsoft, 2003.

"Microsoft Takes Up Scorecarding; Performance Management app aims to Maximize Office"; eWeek, Oct. 31, 2005.

Tedeschi, Digital Cockpits are a Faster, Much Closer Way of Tracking Performance in a Corporation's Every Corner; New York Times, Jul. 29, 2002.

Havenstein; "BI Reporting Tools Improve"; InfoWorld, vol. 25, No. 45, Nov. 17, 2003.

U.S. Official Action mailed Jan. 6, 2011 in U.S. Appl. No. 11/313,324.

U.S. Official Action mailed Jan. 11, 2011 in U.S. Appl. No. 11/412,458.

"The Balanced Scorecard", http://cc.msncache.com/cache.aspx?q=2846702033267&lang=en-US&mkt=en-US&FORM=CVRE3, 4 pp., Feb. 25, 2006.

U.S. Official Action mailed Apr. 1, 2011 in U.S. Appl. No. 11/313,899.

U.S. Official Action mailed Apr. 4, 2011 in U.S. Appl. No. 11/624,171.

U.S. Official Action mailed Apr. 12, 2011 in U.S. Appl. No. 11/623,953.

U.S. Official Action mailed May 10, 2011 in U.S. Appl. No. 11/393,335.

U.S. Official Action mailed Jan. 25, 2011 in U.S. Appl. No. 11/280,548.

U.S. Official Action mailed Mar. 1, 2011 in U.S. Appl. No. 11/412,499.
U.S. Official Action mailed Mar. 2, 2011 in U.S. Appl. No. 11/624,122.
U.S. Official Action mailed Mar. 4, 2011 in U.S. Appl. No. 11/668,763.
U.S. Official Action mailed May 18, 2011 in U.S. Appl. No. 11/670,444.
U.S. Official Action mailed May 23, 2011 in U.S. Appl. No. 11/623,818.
U.S. Official Action mailed Jun. 13, 2011 in U.S. Appl. No. 11/668,520.
U.S. Official Action mailed Jun. 21, 2011 in U.S. Appl. No. 11/408,450.
U.S. Official Action mailed Jun. 24, 2011 in U.S. Appl. No. 11/280,548.
U.S. Official Action mailed Jul. 6, 2011 in U.S. Appl. No. 11/214,678.
U.S. Official Action mailed Jul. 14, 2011 in U.S. Appl. No. 11/668,763.
U.S. Official Action mailed Aug. 8, 2011 in U.S. Appl. No. 11/313,324.
U.S. Official Action mailed Mar. 12, 2012 in U.S. Appl. No. 11/627,640.
U.S. Official Action mailed Apr. 20, 2012 in U.S. Appl. No. 11/412,499.
U.S. Appl. No. 13/404,032, filed Feb. 24, 2012 entitled "Concerted Coordination of Multidimensional Scorecards".
MrExcel Consulting, Using Excel to Track Student Grades; Nov. 2006; 6 pgs.
Kraynak, "Absolute Beginner's Guide to Microsoft Excel 2003", Sep. 2003, Appendix A; 4 pgs.
"Reveleus Business Analytics," Reveleus, an i-flex business, pp. 1-4 No date available.
U.S. Official Action mailed Oct. 4, 2011 in U.S. Appl. No. 11/624,171.
U.S. Official Action mailed Mar. 5, 2012 in U.S. Appl. No. 11/623,953.
U.S. Official Action mailed May 31, 2012 in U.S. Appl. No. 11/670,444.
U.S. Official Action mailed Jun. 27, 2012 in U.S. Appl. No. 11/313,899.
U.S. Official Action mailed Oct. 24, 2011 in U.S. Appl. No. 11/393,335.
U.S. Official Action mailed Nov. 9, 2011 in U.S. Appl. No. 11/623,818.
U.S. Official Action mailed Nov. 10, 2011 in U.S. Appl. No. 11/627,640.
U.S. Official Action mailed Nov. 28, 2011 in U.S. Appl. No. 11/668,763.
U.S. Official Action mailed Dec. 1, 2011 in U.S. Appl. No. 11/670,444.
U.S. Official Action mailed Dec. 12, 2011 in U.S. Appl. No. 11/313,899.
U.S. Official Action mailed Jan. 4, 2012 in U.S. Appl. No. 11/280,548.
U.S. Official Action mailed Oct. 5, 2012 in U.S. Appl. No. 11/623,953.
U.S. Official Action mailed Oct. 23, 2012 in U.S. Appl. No. 11/627,640.
U.S. Official Action mailed Dec. 21, 2012 in U.S. Appl. No. 13/404,032.
U.S. Official Action mailed Feb. 26, 2013 in U.S. Appl. No. 11/313,327.
U.S. Official Action mailed Apr. 8, 2013 in U.S. Appl. No. 11/039,714.
U.S. Official Action mailed Apr. 30, 2013 in U.S. Appl. No. 13/404,032.
U.S. Official Action mailed May 8, 2013 in U.S. Appl. No. 11/627,640.
U.S. Official Action mailed May 17, 2013 in U.S. Appl. No. 11/623,953.
Rutledge, Patrice-Anne et al., "Special Edition Using Microsoft Office PowerPoint 2003"; Sep. 13, 2003; Que; pp. 115-117 & 127-128.

* cited by examiner

EXAMPLE SCORECARD APPLICATION SCREENSHOT

FIG. 4

EXAMPLE SCORECARD APPLICATION WITH COLLABORATIVE FEATURES

*DROPDOWN MENU FOR COLLABORATIVE ACTIONS*

EXAMPLE NETWORKED
ENVIRONMENT

REAL TIME COLLABORATION USING EMBEDDED DATA VISUALIZATIONS

BACKGROUND

Key Performance Indicators (KPIs) are quantifiable measurements that reflect the critical success factors of an organization ranging from income that comes from return customers to percentage of customer calls answered in the first minute. Key Performance Indicators may also be used to measure performance in other types of organizations such as schools, social service organizations, and the like. Measures employed as KPI within an organization may include a variety of types such as revenue in currency, growth or decrease of a measure in percentage, actual values of a measurable quantity, and the like.

Many analytic tools used in performance metric space to drill down into data are typically designed as single-users systems. Without the ability to collaborate with peers on the patterns and anomalies found in data, users are left to their own assumptions, which—as they are compounded in further analysis—can lead to misunderstandings and expensive errors based on misinterpreted data.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to enabling users to participate in a real-time collaborative environment using performance metric applications, where questions and concerns about data being analyzed can be immediately discussed. Performance metric applications embedded in communication applications or communication applications embedded in performance metric applications may enable context based collaboration through local implementation or in a service based architecture.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 4 illustrates a screenshot of an example scorecard application user interface with collaborative features;

DETAILED DESCRIPTION

As briefly described above, users are enabled to participate in a real-time collaborative environment within specific peer groups using performance metric applications. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
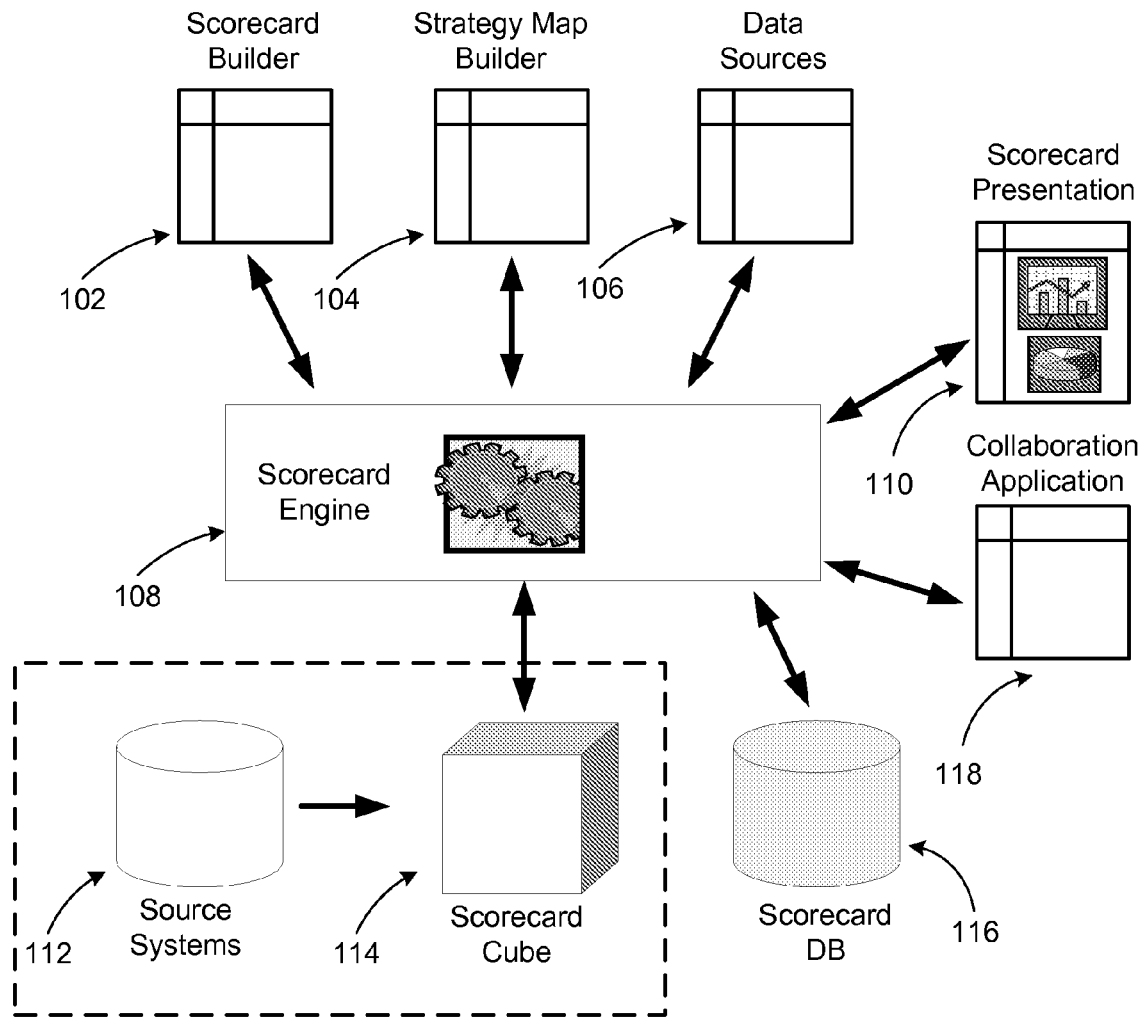
FIG. 1 illustrates an example scorecard architecture.

Referring to FIG. 1, an example scorecard architecture is illustrated. The scorecard architecture may comprise any topology of processing systems, storage systems, source systems, and configuration systems. The scorecard architecture may also have a static or dynamic topology.

Scorecards are an easy method of evaluating organizational performance. The performance measures may vary from financial data such as sales growth to service information such as customer complaints. In a non-business environment, student performances and teacher assessments may be another example of performance measures that can employ scorecards for evaluating organizational performance. In the exemplary scorecard architecture, a core of the system is scorecard engine 108. Scorecard engine 108 may be an application software that is arranged to evaluate performance metrics. Scorecard engine 108 may be loaded into a server, executed over a distributed network, executed in a client device, and the like.

Data for evaluating various measures may be provided by a data source. The data source may include source systems 112, which provide data to a scorecard cube 114. Source systems 112 may include multi-dimensional databases such OLAP, other databases, individual files, and the like, that provide raw data for generation of scorecards. Scorecard cube 114 is a multi-dimensional database for storing data to be used in determining Key Performance Indicators (KPIs) as well as generated scorecards themselves. As discussed above, the multi-dimensional nature of scorecard cube 114 enables storage, use, and presentation of data over multiple dimensions such as compound performance indicators for different geographic areas, organizational groups, or even for different time intervals. Scorecard cube 114 has a bi-directional interaction with scorecard engine 108 providing and receiving raw data as well as generated scorecards.

Scorecard database 116 is arranged to operate in a similar manner to scorecard cube 114. In one embodiment, scorecard database 116 may be an external database providing redundant back-up database service.

Scorecard builder 102 may be a separate application or a part of a business logic application such as the performance evaluation application, and the like. Scorecard builder 102 is employed to configure various parameters of scorecard engine 108 such as scorecard elements, default values for actuals, targets, and the like. Scorecard builder 102 may include a user interface such as a web service, a GUI, and the like.

Strategy map builder 104 is employed for a later stage in scorecard generation process. As explained below, scores for KPIs and other metrics may be presented to a user in form of a strategy map. Strategy map builder 104 may include a user interface for selecting graphical formats, indicator elements, and other graphical parameters of the presentation.

Data Sources 106 may be another source for providing raw data to scorecard engine 108. Data sources 106 may also define KPI mappings and other associated data.

Additionally, the scorecard architecture may include scorecard presentation 110. This may be an application to deploy scorecards, customize views, coordinate distribution of scorecard data, and process web-specific applications associated with the performance evaluation process. For example, scorecard presentation 110 may include a web-based printing system, an email distribution system, and the like. In some embodiments, scorecard presentation 110 may be an interface that is used as part of the scorecard engine to export data and/or views to a desktop visualization application enabling visualizations of performance metric (e.g. using composite objects).

Scorecard architecture may also include collaboration application 118 that enables users to exchange information, talk, hold video conference, and perform other forms of collaboration about the performance metrics processed by the scorecard engine 108.

Figure 2:
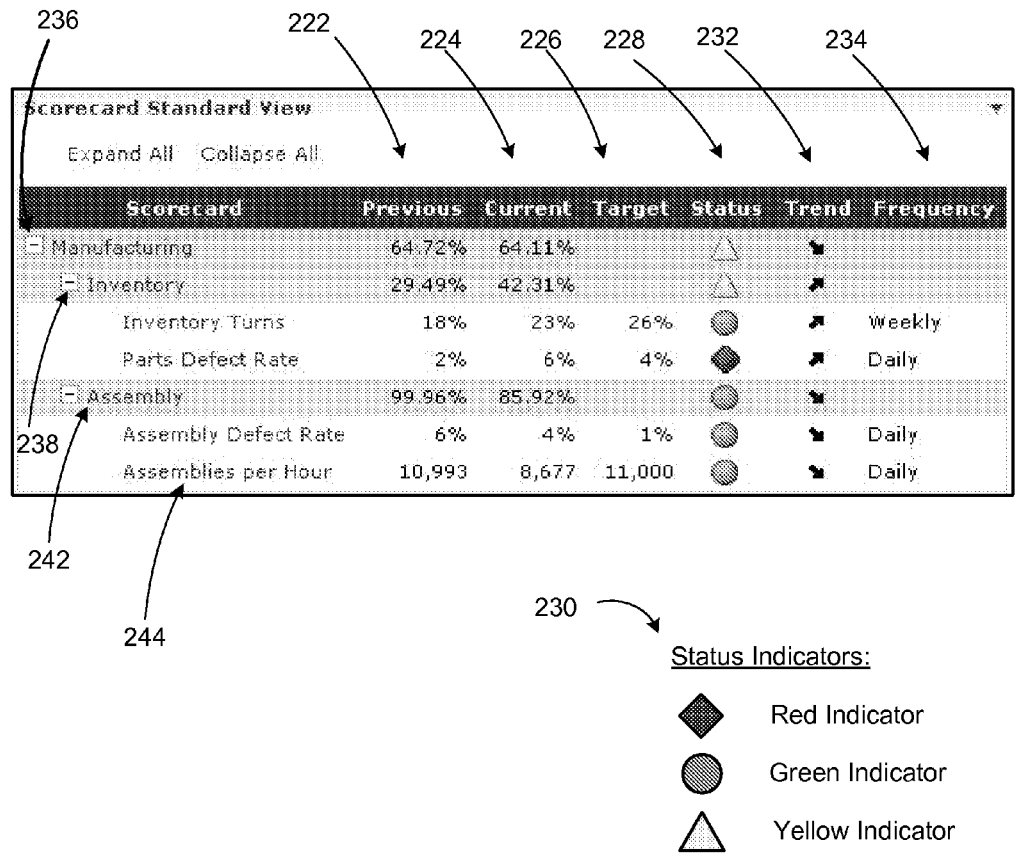
FIG. 2 illustrates a screenshot of an example scorecard.

FIG. 2 illustrates a screenshot of an example scorecard with status indicators 230. As explained before, Key Performance Indicators (KPIs) are specific indicators of organizational performance that measure a current state in relation to meeting the targeted objectives. Decision makers may utilize these indicators to manage the organization more effectively.

When creating a KPI, the KPI definition may be used across several scorecards. This is useful when different scorecard managers might have a shared KPI in common. This may ensure a standard definition is used for that KPI. Despite the shared definition, each individual scorecard may utilize a different data source and data mappings for the actual KPI.

Each KPI may include a number of attributes. Some of these attributes include frequency of data, unit of measure, trend type, weight, and other attributes.

The frequency of data identifies how often the data is updated in the source database (cube). The frequency of data may include: Daily, Weekly, Monthly, Quarterly, and Annually.

The unit of measure provides an interpretation for the KPI. Some of the units of measure are: Integer, Decimal, Percent, Days, and Currency. These examples are not exhaustive, and other elements may be added without departing from the scope of the invention.

A trend type may be set according to whether an increasing trend is desirable or not. For example, increasing profit is a desirable trend, while increasing defect rates is not. The trend type may be used in determining the KPI status to display and in setting and interpreting the KPI banding boundary values. The arrows displayed in the scorecard of FIG. 2 indicate how the numbers are moving this period compared to last. If in this period the number is greater than last period, the trend is up regardless of the trend type. Possible trend types may include: Increasing Is Better, Decreasing Is Better, and On-Target Is Better.

Weight is a positive integer used to qualify the relative value of a KPI in relation to other KPIs. It is used to calculate the aggregated scorecard value. For example, if an Objective in a scorecard has two KPIs, the first KPI has a weight of 1, and the second has a weight of 3 the second KPI is essentially three times more important than the first, and this weighted relationship is part of the calculation when the KPIs' values are rolled up to derive the values of their parent metric.

Other attributes may contain pointers to custom attributes that may be created for documentation purposes or used for various other aspects of the scorecard system such as creating different views in different graphical representations of the finished scorecard. Custom attributes may be created for any scorecard element and may be extended or customized by application developers or users for use in their own applications. They may be any of a number of types including text, numbers, percentages, dates, and hyperlinks.

One of the benefits of defining a scorecard is the ability to easily quantify and visualize performance in meeting organizational strategy. By providing a status at an overall scorecard level, and for each perspective, each objective or each KPI rollup, one may quickly identify where one might be off target. By utilizing the hierarchical scorecard definition along with KPI weightings, a status value is calculated at each level of the scorecard.

First column of the scorecard shows example top level metric 236 "Manufacturing" with its reporting KPIs 238 and 242 "Inventory" and "Assembly". Second column 222 in the scorecard shows results for each measure from a previous measurement period. Third column 224 shows results for the same measures for the current measurement period. In one embodiment, the measurement period may include a month, a quarter, a tax year, a calendar year, and the like.

Fourth column 226 includes target values for specified KPIs on the scorecard. Target values may be retrieved from a database, entered by a user, and the like. Column 228 of the scorecard shows status indicators 230.

Status indicators 230 convey the state of the KPI. An indicator may have a predetermined number of levels. A traffic light is one of the most commonly used indicators. It represents a KPI with three-levels of results—Good, Neutral, and Bad. Traffic light indicators may be colored red, yellow, or green. In addition, each colored indicator may have its own unique shape. A KPI may have one stoplight indicator visible at any given time. Other types of indicators may also be employed to provide status feedback. For example, indicators with more than three levels may appear as a bar divided into sections, or bands. Column 232 includes trend type arrows as explained above under KPI attributes. Column 234 shows another KPI attribute, frequency.

Figure 3:
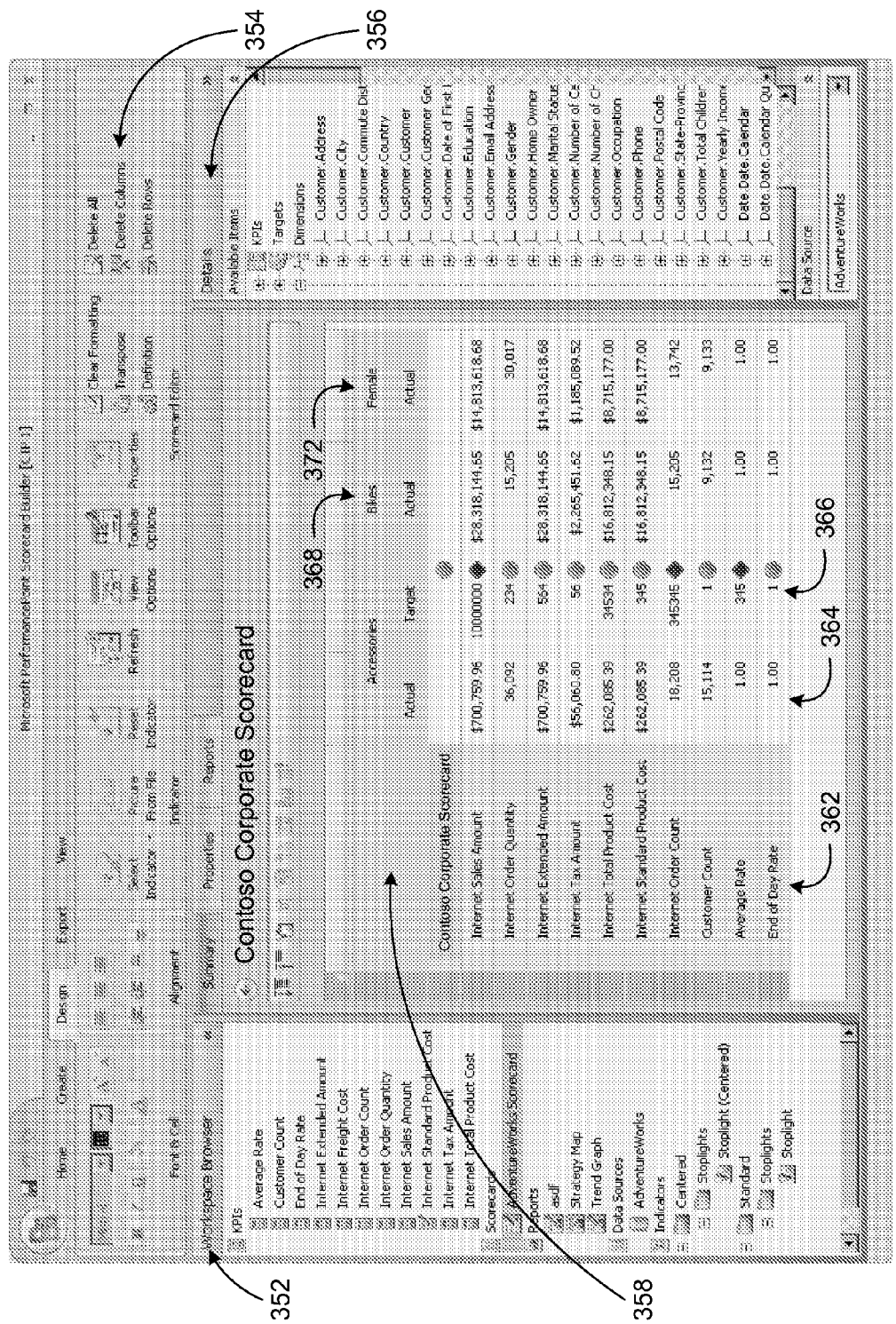
FIG. 3 illustrates a screenshot of an example scorecard application user interface.

FIG. 3 is a screenshot of an example scorecard application with an example scorecard. The example scorecard application may be part of a business logic service that collects, processes, and analyzes performance data from various aspects of an organization.

The user interface of the scorecard application as shown in the screenshot include controls 354 for performing actions such as formatting of data, view options, actions on the presented information, and the like. The main portion of the user interface displays scorecard 358 "Contoso Corporate Scorecard". The scorecard includes metrics such as "Internet Sales Amount", "Internet Order Quantity", "Customer Count", and the like in column 362. Columns 364 and 366 respectively display actuals and targets for the category of "Accessories" for each of the listed metrics. Columns 368 and 372 display the actuals for the categories "Bikes" and "Female" (referring to female bikes).

Side panel 352 titled "Workspace Browser" provides a selection of available KPIs as well as elements of the scorecard such indicators and reports that are associated with the selected scorecard. Other side panel 356 provides additional details about available scorecard elements such as a collapsible list of KPIs, targets, and dimension combinations. A scorecard application, as discussed in further detail below, may include additional aspects of the scorecard such as different visualizations, linked information (geography, time and date, contact information, etc.), commentary, and so on.

A number of controls may be provided in a scorecard application user interface for providing personalized and scalable metrics information to a user. For example, the user may be enabled to view reports, data, commentary, and so on by clicking on any one of the scorecard elements.

Figure 4:
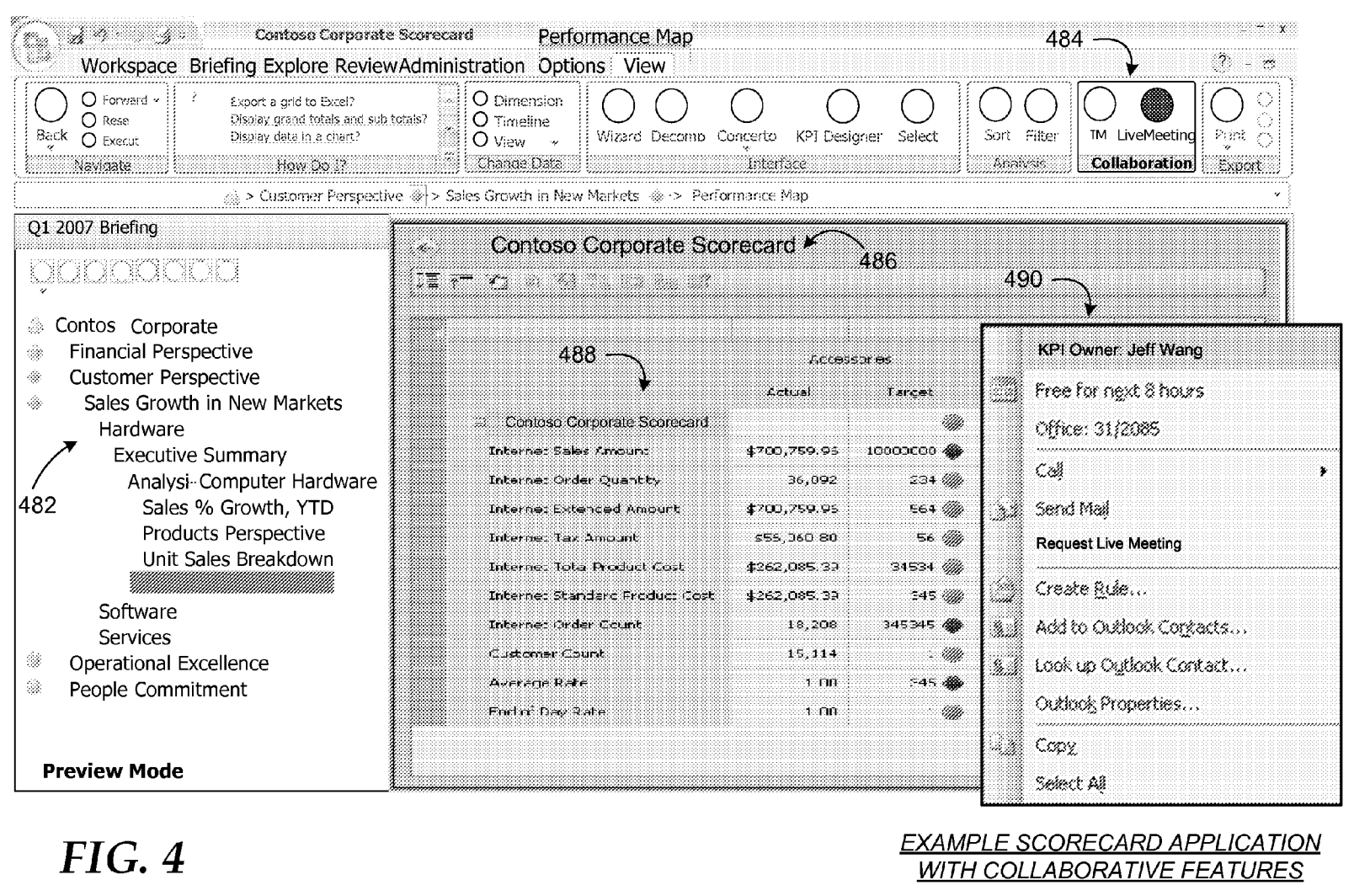

FIG. 4 illustrates a screenshot of an example scorecard application user interface with collaborative features. To enable collaboration between users on performance metrics, communication applications may be embedded into scorecard applications or vice versa.

The scorecard application user interface in FIG. 4 includes a view of example scorecard 486 with its hierarchically structured metrics 488 their actuals, targets, and status indicators. Individual metrics may also be selected from an indented list 482 on the side panel.

The user interface also includes controls for scorecard related actions, navigation actions, analysis actions, as well as collaboration actions 484. In the example user interface, two collaboration options are provided, instant messaging and live meeting. Another approach for providing collaboration actions is a pop-up style dropdown menu 490 for user selection. Details of the example dropdown menu are provided below.

Figure 5:
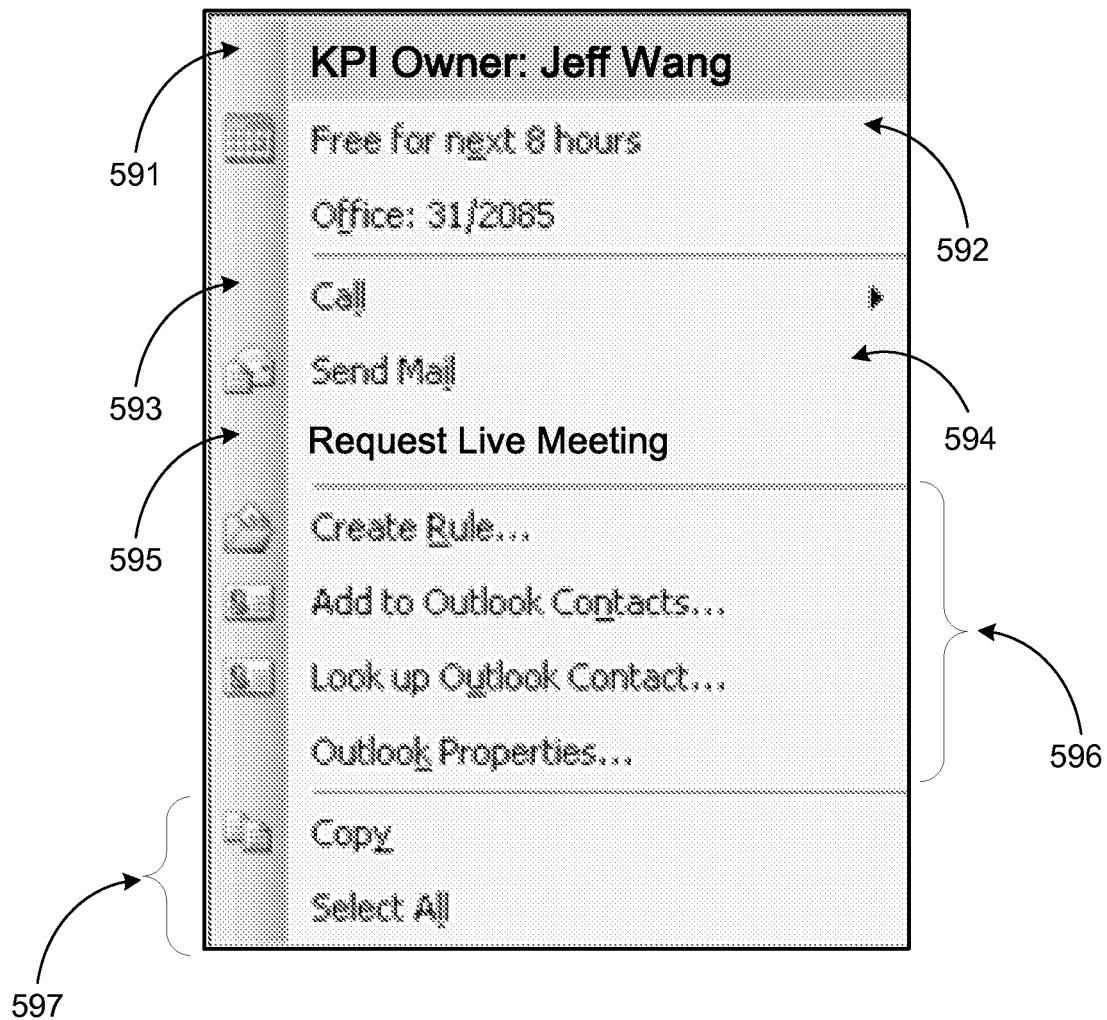
FIG. 5 illustrates a screenshot of a dropdown menu for collaborative actions associated with a scorecard application.

FIG. 5 illustrates a screenshot of a dropdown menu for collaborative actions associated with a scorecard application.

The dropdown menu may be activated in response to a selection of a metric (e.g. a KPI) and include an indication of a metric owner (KPI Owner: Jeff Wang). The dropdown menu may include personal information about the owner such as availability information 592 and office information.

Next, available collaboration options are provided for selection. In the example dropdown menu, available options include phone call 593, email 594, and live meeting 595. Other options such as video conference, instant messaging, and so on may also be provided. Phone call 593 may be a Voice Over IP (VOIP) call, a Public Switched Telephone Network (PSTN) call, an Internet Telephony call, and the like.

Other actions (596) provided in the dropdown menu include electronic mail options such as adding to contacts, looking up in contacts, and the like. Typical desktop application actions like copy and select (597) may also be provided.

Figure 6:
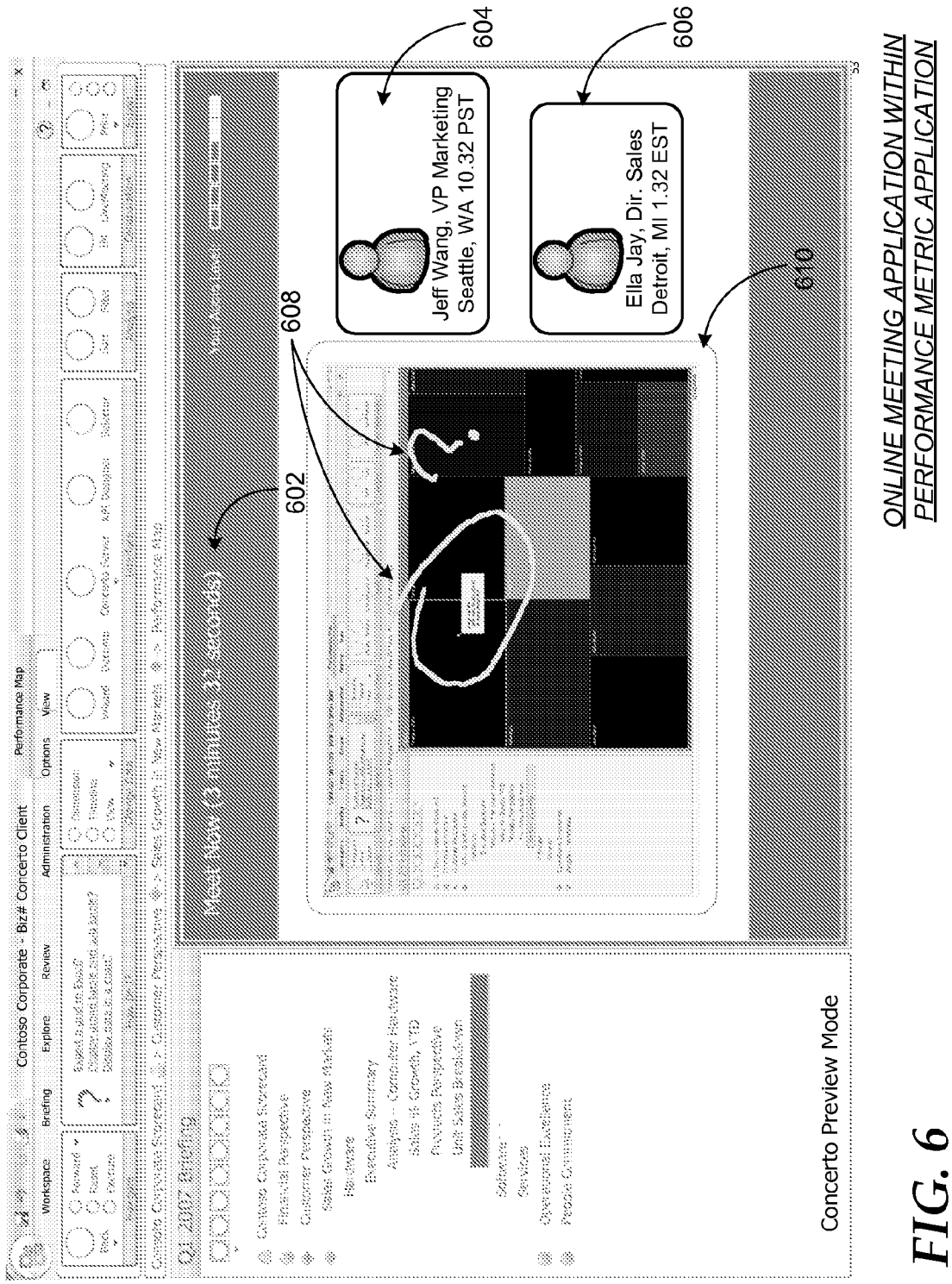
FIG. 6 illustrates a screenshot of an example online meeting using an application for performance metrics.

FIG. 6 illustrates a screenshot of an example online meeting using an application for performance metrics. The screenshot is another example of a communication application embedded in a performance metric application.

The controls at the top portion of the user interface and the list of metrics selection on the side panel are similar to those in FIG. 4. On the main panel of the user interface an online meeting user interface is displayed. Status indicator 602 provides the status (meeting on) and the time has passed since the beginning of the meeting. Panel 610 inserted into the meeting space illustrates a report view associated with the scorecard. Participants may make online edits on the report view such as edits 608, which may be stored for subsequent incorporation into the scorecard data.

Meeting participant information 604 and 606 include participants' names, places, local time, as well as pictures of the participants. The pictures may be live video feeds from the participants' locations.

Figure 7:
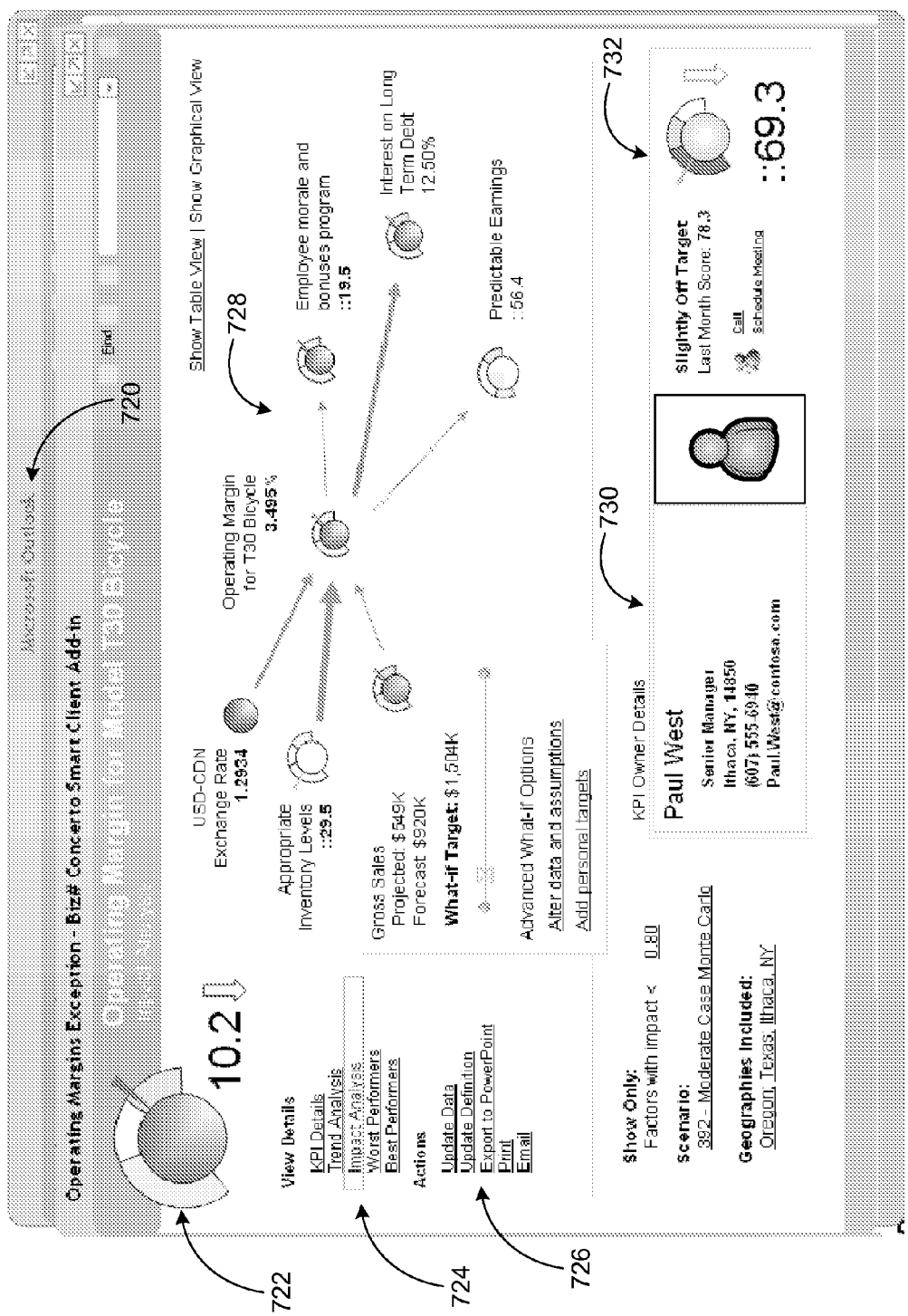
FIG. 7 illustrates a screenshot of an example performance metric user interface within an electronic mail application.

FIG. 7 illustrates a screenshot of an example performance metric user interface within an electronic mail application. As mentioned before, collaboration applications may be embedded into a performance metric application or the performance metric application may be embedded into a collaboration application.

Electronic mail application 720 may have typical features of an electronic mail application such as a preview pane, menu items for composing, sending, replying to, forwarding a message, and so on. An electronic mail application according to embodiments may also include a separate panel (or tab) for providing a user interface for the embeddable performance metric application.

The performance metric application user interface within the electronic mail application may include various visualizations of metric data and controls associated with performance metric computations. Composite gauge 722 provides information associated with "operating margin for Model T30 bicycle". The gauge is complemented by numeric display of change in the metric and a down arrow indicating the trend of the metric.

Diagram 728 in the center of the user interface shows relationships between different metrics such as metrics that report to the "operating margin for Model T30 bicycle" metric and metrics to which "operating margin for Model T30 bicycle" reports. Each metric is displayed with a gauge and numeric information conveying its status.

View details 724 provide options to a user for selecting different analysis and report types. Actions section 726 provides options for various user actions such as printing, emailing, updating data, and so on associated with the metric in view. If the emailing option is selected the user interface may revert to standard user interface of the electronic mail application 720.

Panel 730 of the user interface provides details about the metric owner (e.g. contact information), as well as metric view 732 displaying status of the metric with the previous period's score. The personal information of the metric owner may be retrieved from a Contacts database of the electronic mail application 720.

Composite gauge 722 is one example of visual representations of metric data. Other visualizations may include one or more indicators such as circled check marks, check marks, flags, pie chart icons, traffic signs, traffic lights, and the like, which utilize shape and color to convey performance metric information to the user. The indicators employ geometric units to visualize business performance and show magnitude, patterns of structured and unstructured data, interrelationships, causalities, and dependencies. Through visualizing outputs of quantitative models business users may be enabled to make faster, more relevant decisions based on data that is readily interpreted. A background color or shape of the visualizations may be used to reflect the performance metric status according to a scheme (e.g. green for on target, yellow for slightly off target, and red for off target).

Figure 8:
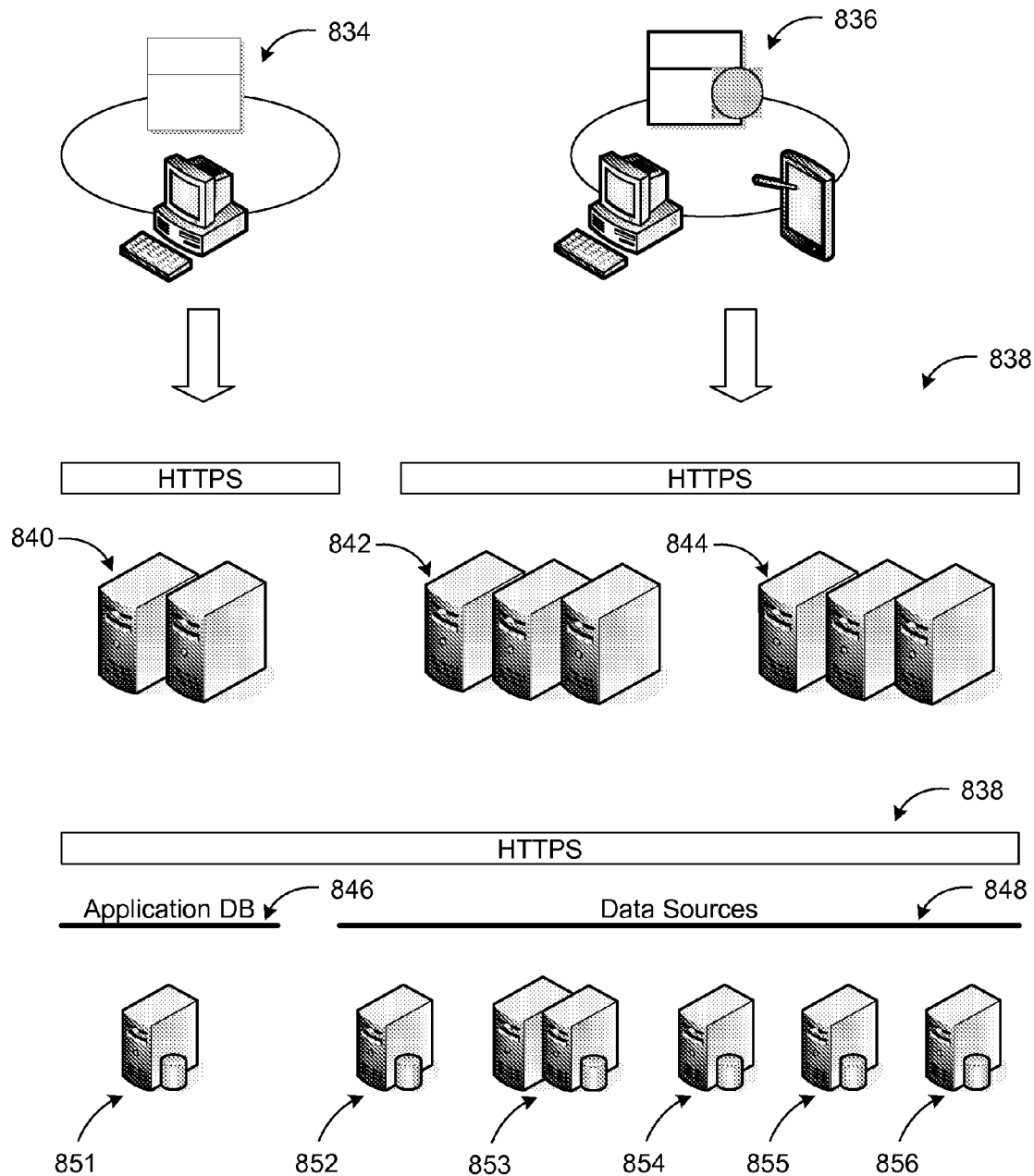
FIG. 8 illustrates an example service-based architecture in which an application for performance metrics with collaborative features may be deployed.

FIG. 8 illustrates an example service based architecture in which an application for performance metrics with collaborative features may be deployed. Service based architectures are an increasingly popular style for building software applications that use services available in a network such as the web. They promote loose coupling between software components so that they can be reused. Applications in a service based architecture are built based on services. A service is an implementation of a well-defined business functionality, and such services can then be consumed by clients in different applications or business processes.

A service based architecture allows for the reuse of existing assets where new services can be created from an existing infrastructure of systems. In other words, it enables businesses to leverage existing investments by allowing them to reuse existing applications, and promises interoperability between heterogeneous applications and technologies. Service based architectures provide a level of flexibility in the sense that services are software components with well-defined interfaces that are implementation-independent. An important aspect of service based architecture is the separation of the service interface from its implementation. Such services are consumed by clients that are not concerned with how these services will execute their requests. Services are commonly self-contained (perform predetermined tasks) and loosely coupled. Furthermore, services can be dynamically discovered, and composite services can be built from aggregates of other services.

A service based architecture uses a find-bind-execute paradigm. In this paradigm, service providers register their service in a public registry. This registry is used by consumers to find services that match certain criteria. If the registry has such a service, it provides the consumer with a contract and an endpoint address for that service. Service based applications are typically distributed multi-tier applications that have presentation, business logic, and persistence layers. Services are the building blocks of service based applications.

In FIG. 8, data associated with performance metric calculations may be stored and provided by scorecard database(s) 846 managed by scorecard database server 851. Scorecard database server 851 may manage exchange of scorecard data based granular, role based permissions. Source data for metric calculations and statistical analyses may be provided by data sources 848.

Data sources 848 may include business models database server 852, analysis services database server(s) 853, tables server 854, lists server 855, files server 856 (e.g. text files, spreadsheet files, and the like), and so on. The data sources may be managed by one or more servers of any type discussed herein. The scorecard database server and data source servers may communicate with servers managing performance metric services through a secure network communication protocol such as HTTPS 838.

Performance metric services may include scorecard service managed by scorecard server(s) 840. Scorecard server(s) 840 may also provide web services. Reporting services may be provided by one or more reporting servers 842. Reporting services may include providing results of statistical analyses, performance metric computations, presentations, and the like in various formats based on subscriber permissions, profiles, client devices, and client applications. According to an example embodiment, data may be provided to one or more desktop visualization applications installed on a user's desktop such that a limited presentation is portrayed on the user's desktop.

Moreover, shared services servers 844 may manage shared services that enable individual users to access the scorecard services, presentations, and data through client devices 836. Shared services servers 844 may also provide collaboration services to client devices 836 such as electronic mail, instant messaging, audio or video conferencing, online meetings, and the like. Client devices 836 may include specialized applications such as communication application or web applications to facilitate the communication through a secure protocol such as HTTPS 838.

Scorecard computations may also be performed in coordination with scorecard server(s) 840 by a client application on client device 834 communicating with the scorecard servers through HTTPS 838. As illustrated by reporting servers 842 and shared services servers 844, some or all of the servers at different levels of the architecture may support web farming.

Figure 9:
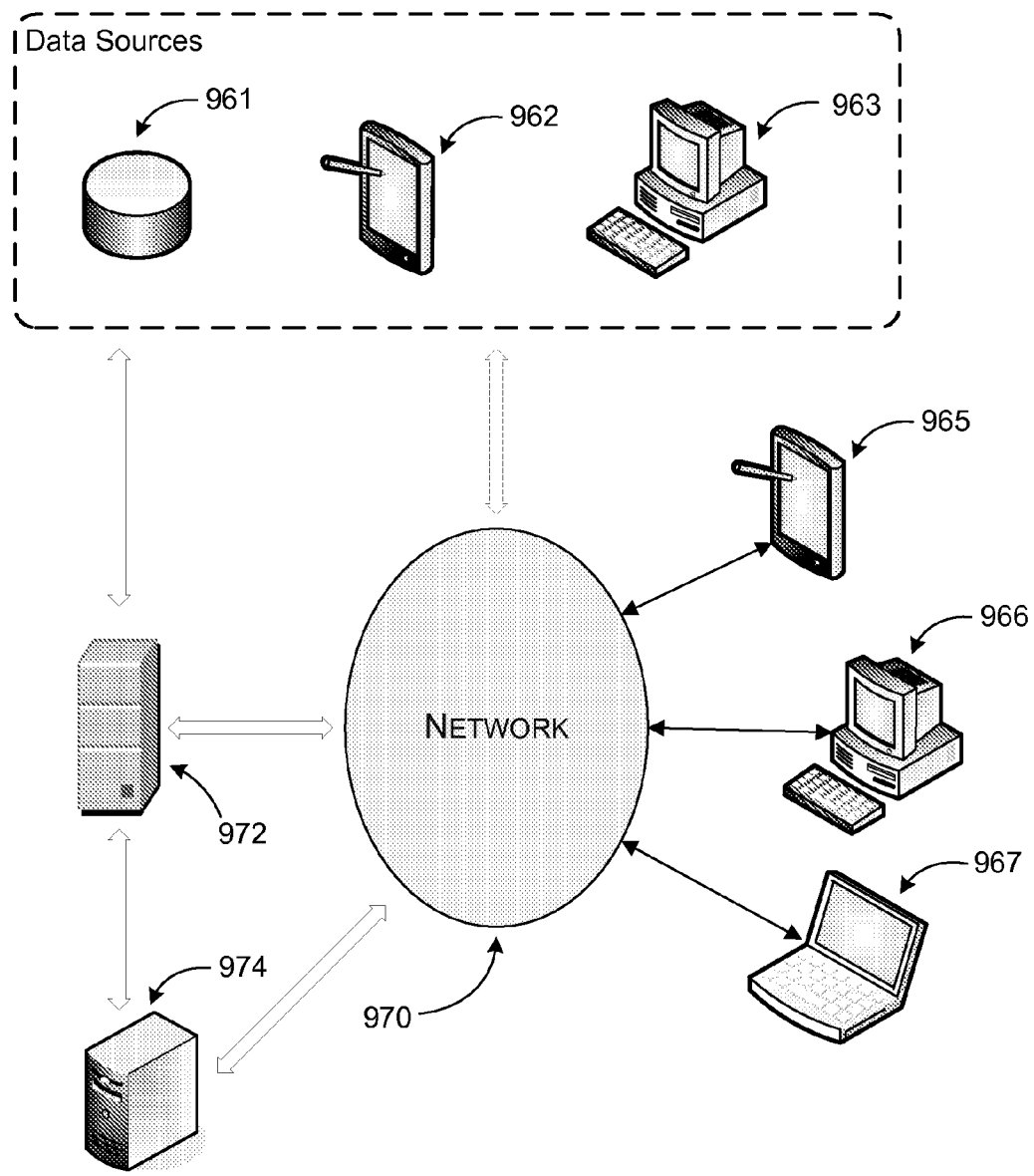
FIG. 9 is a diagram of a networked environment where embodiments may be implemented.
Figure 10:
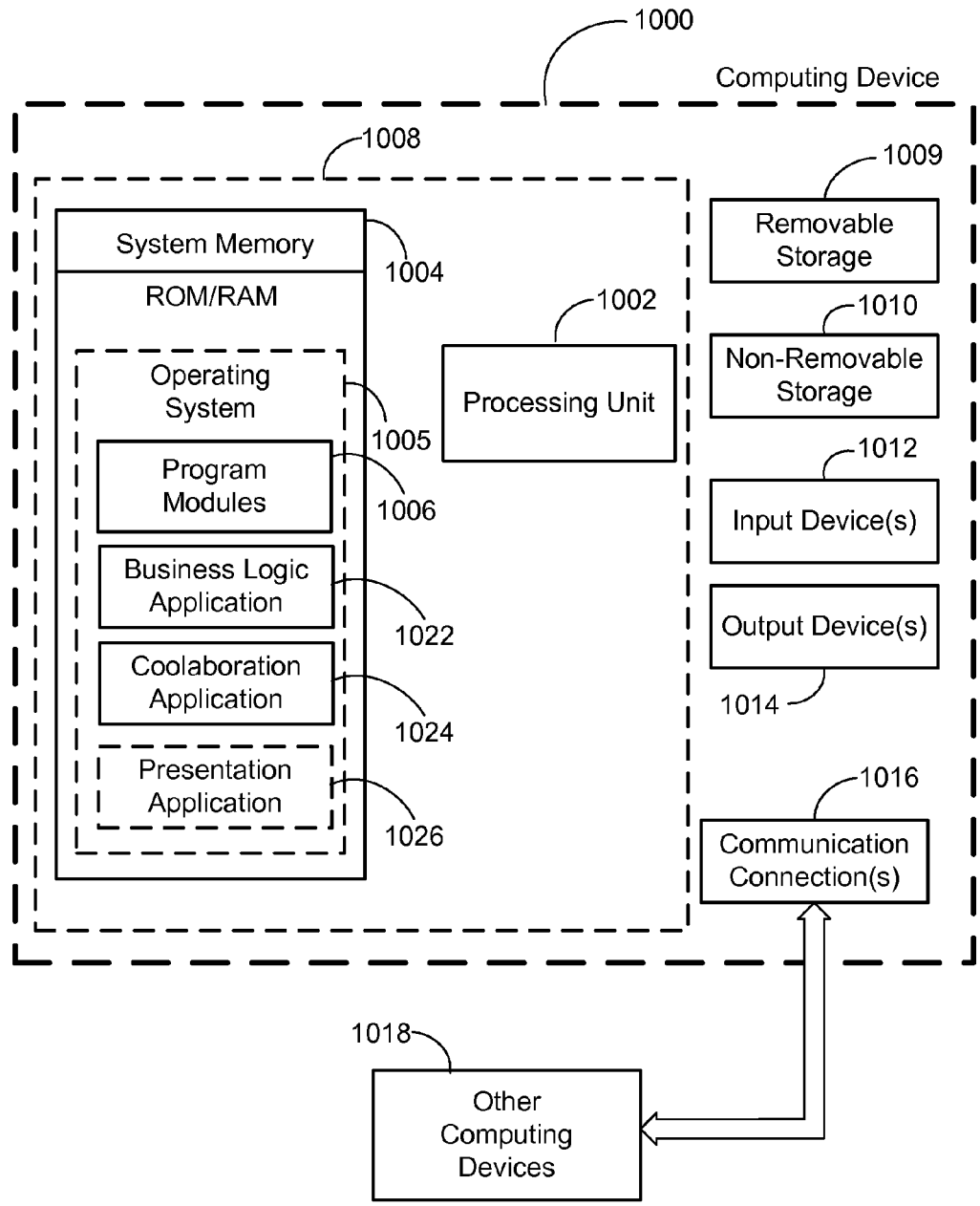
FIG. 10 is a block diagram of an example computing operating environment, where embodiments may be implemented.

Referring now to the following figures, aspects and exemplary operating environments will be described. FIG. 9, FIG. 10, and the associated discussion are intended to provide a brief, general description of a suitable computing environment in which embodiments may be implemented.

FIG. 9 is a diagram of a networked environment where embodiments may be implemented. The system may comprise any topology of servers, clients, Internet service providers, and communication media. Also, the system may have a static or dynamic topology. The term "client" may refer to a client application or a client device employed by a user to perform operations associated with rendering performance metric data using geometric objects. While a networked business logic system may involve many more components, relevant ones are discussed in conjunction with this figure.

In a typical operation according to embodiments, business logic service may be provided centrally from server 972 or in a distributed manner over several servers (e.g. servers 972 and 974) and/or client devices. Server 972 may include implementation of a number of information systems such as performance measures, business scorecards, and exception reporting. A number of organization-specific applications including, but not limited to, financial reporting/analysis, booking, marketing analysis, customer service, collaboration services, and manufacturing planning applications may also be configured, deployed, and shared in the networked system.

Data sources 961-963 are examples of a number of data sources that may provide input to server 972. Additional data sources may include SQL servers, databases, non multi-dimensional data sources such as text files or EXCEL® sheets, multi-dimensional data source such as data cubes, and the like.

Users may interact with the server running the business logic service from client devices 965-967 over network 970. Users may also directly access the data from server 972 and perform analysis on their own machines. In some embodiments, users may collaborate with others through communication applications that are coordinated with the business logic service for cooperating on scorecard operations.

Client devices 965-967 or servers 972 and 974 may be in communications with additional client devices or additional servers over network 970. Network 970 may include a secure network such as an enterprise network, an unsecure network such as a wireless open network, or the Internet. Network 970 provides communication between the nodes described herein. By way of example, and not limitation, network 970 may include wired media such as a wired network or direct-wired connection, and wireless media such as acoustic, RF, infrared and other wireless media.

Many other configurations of computing devices, applications, data sources, data distribution and analysis systems may be employed to implement collaboration using embedded performance metric data visualizations. Furthermore, the networked environments discussed in FIG. 9 are for illustration purposes only. Embodiments are not limited to the example applications, modules, or processes. A networked environment for may be provided in many other ways using the principles described herein.

With reference to FIG. 10, a block diagram of an example computing operating environment is illustrated, such as computing device 1000. In a basic configuration, the computing device 1000 typically includes at least one processing unit 1002 and system memory 1004. Computing device 1000 may include a plurality of processing units that cooperate in executing programs. Depending on the exact configuration and type of computing device, the system memory 1004 may be volatile (such as RAM), non-volatile (such as ROM, flash memory, etc.) or some combination of the two. System memory 1004 typically includes an operating system 1005 suitable for controlling the operation of a networked personal computer, such as the WINDOWS® operating systems from MICROSOFT CORPORATION of Redmond, Wash. The system memory 1004 may also include one or more software applications such as program modules 1006, business logic application 1022, collaboration application 1024, and optional presentation application 1026.

Business logic application 1022 may be any application that processes and generates scorecards and associated data. Collaboration application 1024 may be an online meeting application, an instant messaging application, an electronic mail application, a VOIP application, or a video conference application. Collaboration application 1024 may be embedded within business logic application 1022 or vice versa. Presentation application 1026 or business logic application 1022 may be associated with collaboration application 1024 such that user interfaces or either application may be activated upon user selection through the collaboration application 1024. All three applications may be executed in an operating system other than operating system 1005. This basic configuration is illustrated in FIG. 10 by those components within dashed line 1008.

The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by removable storage 1009 and non-removable storage 1010. Computer storage media may include volatile and nonvolatile, removable and non-removable media implemented in any method or technology for storage of information, such as computer readable instructions, data structures, program modules, or other data. System memory 1004, removable storage 1009 and non-removable storage 1010 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media may be part of device 1000. Computing device 1000 may also have input device(s) 1012 such as keyboard, mouse, pen, voice input device, touch input device, etc. Output device(s) 1014 such as a display, speakers, printer, etc. may also be included. These devices are well known in the art and need not be discussed at length here.

The computing device 1000 may also contain communication connections 1016 that allow the device to communicate with other computing devices 1018, such as over a network in a distributed computing environment, for example, an intranet or the Internet. Communication connection 1016 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 11:
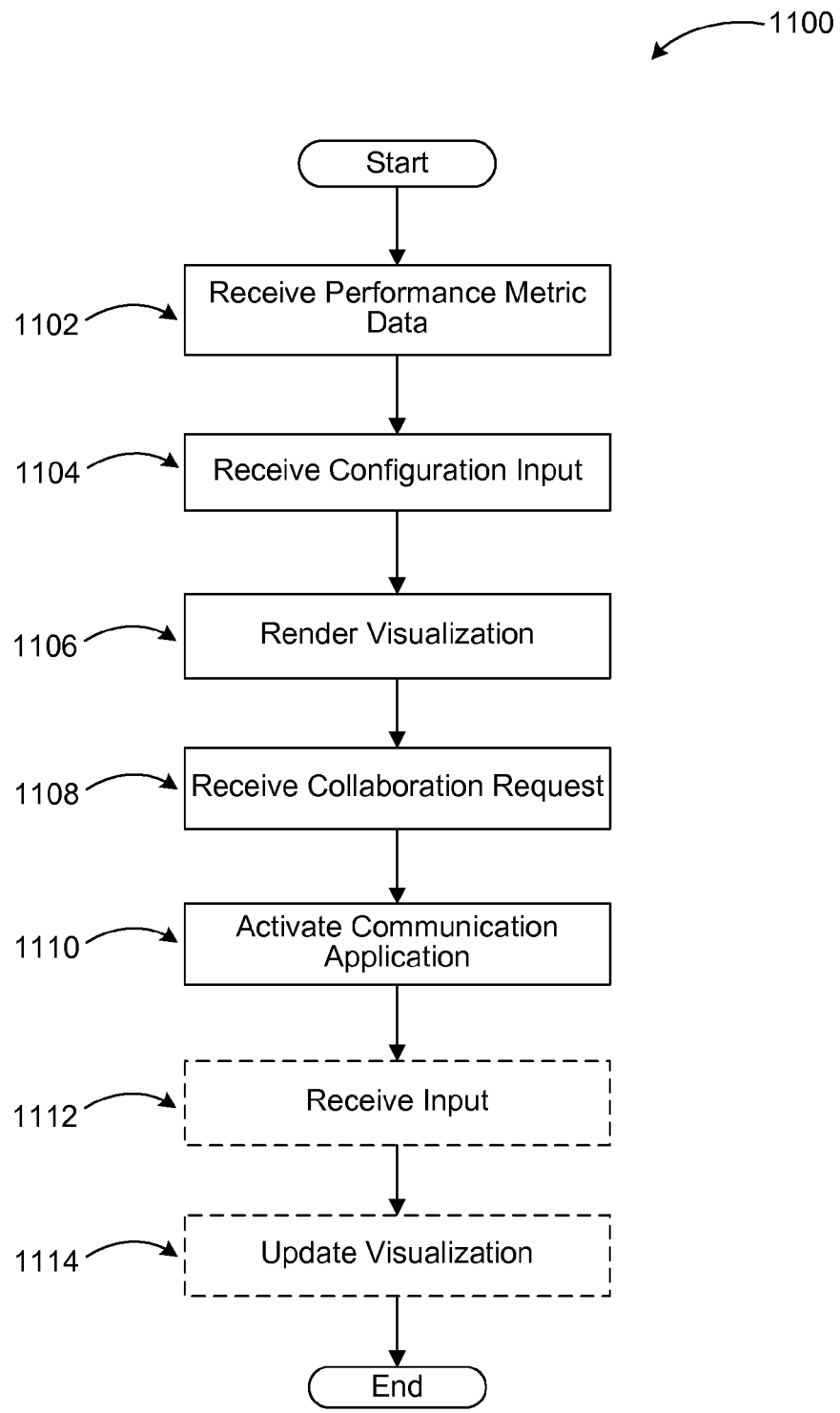
FIG. 11 illustrates a logic flow diagram for a process of collaborating through an application for performance metrics.

FIG. 11 illustrates a logic flow diagram for a process of collaborating through an application for performance metrics. Process 1100 may be implemented in a client device or a service architecture based business logic service.

Process 1100 begins with operation 1102, where performance metric data is received from one or more data sources. Processing advances from operation 1102 to operation 1104.

At operation 1104, a configuration input is received for the performance metric data visualization. The visualization may be configured using the received input from a user or a hosted business service based on a user profile. Processing proceeds from operation 1104 to operation 1106.

At operation 1106, the visualization based on the received performance metric data is rendered. The visualization may include a scorecard view, a report view, combinations, a presentation, and the like. As described previously, one or more indicators, icons, miniature charts, audio, and video may be used to render the visualization. Processing moves from operation 1106 to operation 1108.

At operation 1108, a request for collaboration is received from the user. The collaboration may include communication with other users about the performance metric(s) through electronic mail, instant messaging, audio conference, video conference, online meeting, and the like. Processing advances to operation 1110 from operation 1108.

At operation 1110, a communication application for the collaboration is activated. Processing advances to optional operation 1112 from operation 1110.

At optional operation 1112, an input associated with the performance metric visualization is received from one of the participants of the collaboration. The input may include modification of data or report views, addition of new data, deletion of existing elements, and the like. Processing advances to optional operation 1114 from optional operation 1112.

At optional operation 1114, the visualization is updated based on the input received in optional operation 1112. After operation 1112, processing moves to a calling process for further actions.

The operations included in process 1100 are for illustration purposes. Providing collaboration for performance metric data using embedded data visualizations may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for providing context based collaboration based on performance metrics, the method comprising:
    receiving performance metric data;
    receiving a configuration input for a visualization based on the performance metric data;
    rendering the visualization based on the received performance metric data and the configuration input;
    receiving a selection of at least one performance metric of the performance metric data;
    providing a plurality of collaboration options in a drop down menu having information associated with an owner of the at least one performance metric, in response to receiving the selection, for collaborating with other users over the at least one performance metric;
    receiving a request for collaboration with the owner of the selected at least one performance metric data, the request corresponding to a selected collaboration option of the plurality of collaboration options; and
    facilitating the collaboration with the owner of the selected at least one performance metric data in conjunction with the rendered visualization, wherein facilitating the collaboration with the owner of the selected at least one performance metric data comprises enabling collaboration associated with the selected collaboration option.

2. The method of claim 1, wherein receiving performance metric data comprises receiving at least one of the performance metric data, and wherein receiving the configuration input comprises receiving the configuration input from a hosted business service.

3. The method of claim 1, further comprising:
    receiving the performance metric data from a plurality of data providers, wherein the data providers are partitioned using virtualized instances.

4. The method of claim 1, further comprising:
    aggregating the performance metric data from dependent data feeds.

5. The method of claim 1, wherein the collaboration is facilitated based on at least one of: a user profile and a predefined set of parameters.

6. The method of claim 1, wherein facilitating the collaboration comprises employing a plurality of communication applications.

7. The method of claim 1, further comprising:
    receiving an input for a portion of the visualization during the collaboration; and
    updating the visualization based on the received input.

8. The method of claim 1, further comprising:
    in response to a user selection of a portion of the visualization, providing a user interface for selecting and configuring at least one communication application for the collaboration.

9. A system for providing context based collaboration based on performance metrics, comprising:
    a memory;
    a processor coupled to the memory, wherein the processor is configured to execute:
        receive performance metric data from at least one data source;
        receive a configuration input for a presentation based on the performance metric data;
        render the presentation based on the received performance metric data and the configuration input;
        receive a selection of at least one performance metric in the presentation;
        provide a plurality of collaboration options, in a drop down menu having information associated with an owner of the at least one performance metric, in response to receiving the selection;
        receive a context based request for collaboration, the context based request corresponding to a selected collaboration option of the plurality of collaboration options; and
        configure the collaboration between users based on at least one from a set of: user profiles, user security permissions, and a type of the presentation; and
        facilitate the collaboration corresponding to the selected collaboration option.

10. The system of claim 9, wherein the performance metric application is embedded into the communication application.

11. The system of claim 9, wherein the communication application is embedded into the performance metric application.

12. The system of claim 9, wherein the communication application includes one of: an electronic mail application, an instant messaging application, a video conference application, an online meeting application, and an audio communication application.

13. The system of claim 12, wherein the audio communication application is arranged to provide a phone communication through one of: a Public Switched Telephone Network (PSTN) connection, a Voice Over IP (VoIP) connection, and an Internet telephony connection.

14. The system of claim 9, wherein at least one from a set of: a presentation application, an analysis application, a communication application, a spreadsheet application, and a graphics application is embedded into the performance metric application.

15. A computer-readable storage memory with instructions stored thereon for providing context based collaboration based on performance metrics in a service based architecture, the instructions comprising:

configuring a desktop performance metric application at least in part based on a user input;

registering the desktop performance metric application with a hosted business service;

providing performance metric data to the desktop performance metric application from the hosted business service;

enabling caching of the data at a client device executing the desktop performance metric application;

enabling rendering of a visualization by the desktop performance metric application based on the provided performance metric data;

receiving a selection of at least one performance metric;

providing, in response to receiving the selection, a drop down menu listing of a plurality of collaboration options and information associated with an owner of the at least one performance metric;

receiving a selection of at least one collaboration option of the plurality of collaboration options; and activating a communication application associated with the performance metric application to facilitate the context based collaboration in accordance with the at least one collaboration option.

16. The computer-readable storage memory of claim 15, wherein the instructions further comprise:

tracking activities associated with the collaboration for billing a user by the hosted business service.

17. The computer-readable storage memory of claim 15, wherein the instructions further comprise:

enabling an update of the visualization based on at least one input received during the collaboration.

18. The computer-readable storage memory of claim 15, wherein the instructions further comprise:

providing at least one plug-in module to the desktop performance metric application for a set of operations associated with the performance metric data.

19. The computer-readable storage memory of claim 15, wherein at least one of the desktop performance metric application and the communication application is arranged to receive live data feeds.

20. The computer-readable storage memory of claim 15, wherein the desktop performance metric application is a thin client application arranged to receive parameters from the hosted business service.

* * * * *